Figure 1:
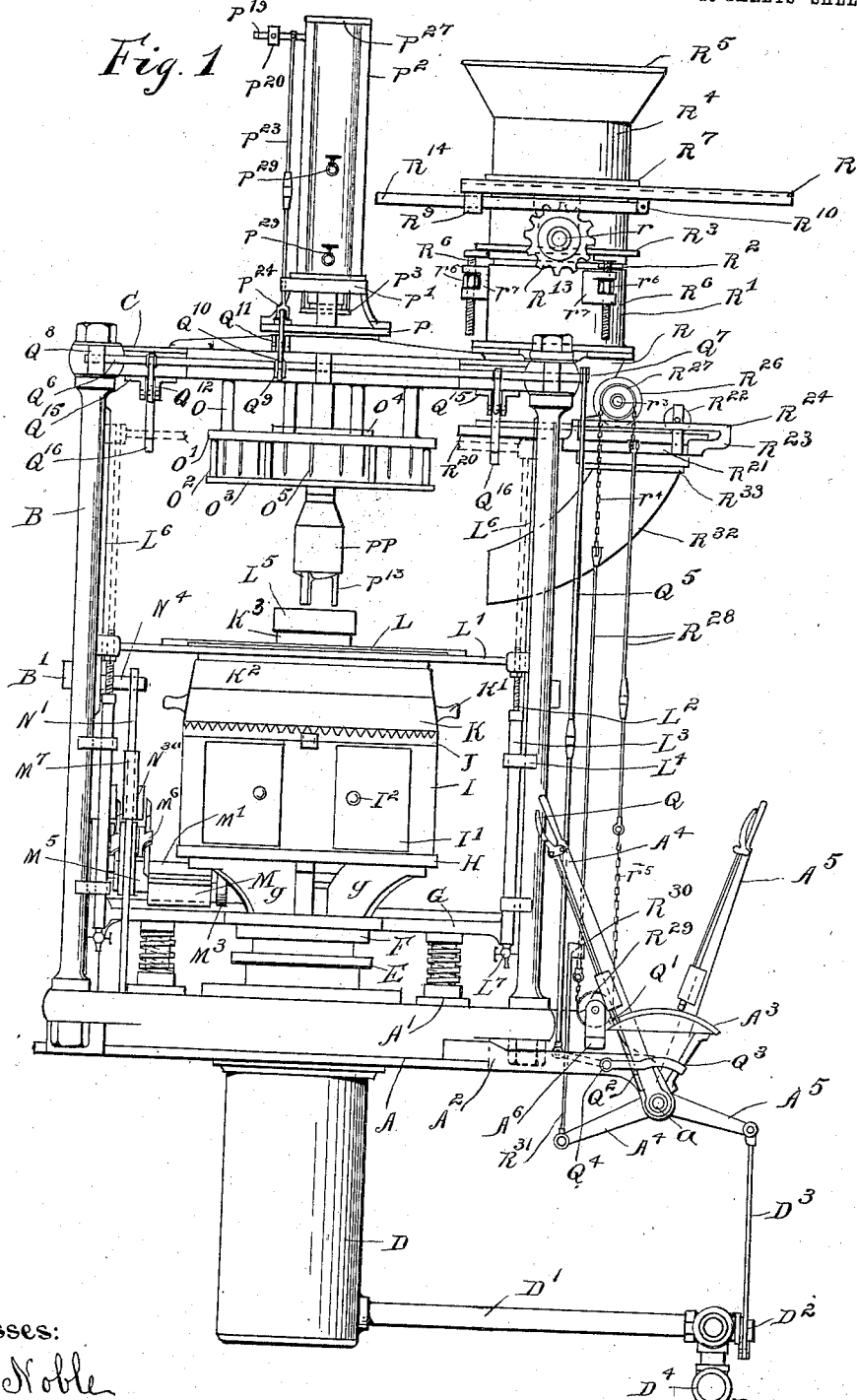

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 1.

Witnesses:
G. S. Noble
Eugene R. Weber

Inventors
Andrew L. Anderson
Oscar Anderson
by Morgan Arvington
Att'ys

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 5.

Witnesses.
G. S. Noble
Eugene R. Weber

Inventors.
Andrew L. Anderson
Oscar Anderson
by Morgan & Reinstein
Att'ys

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 8.

Witnesses.
G. S. Noble
Eugene R. Weber

Inventors.
Andrew L. Anderson
Oscar Anderson
by Morgan & Rubinstein
Att'ys

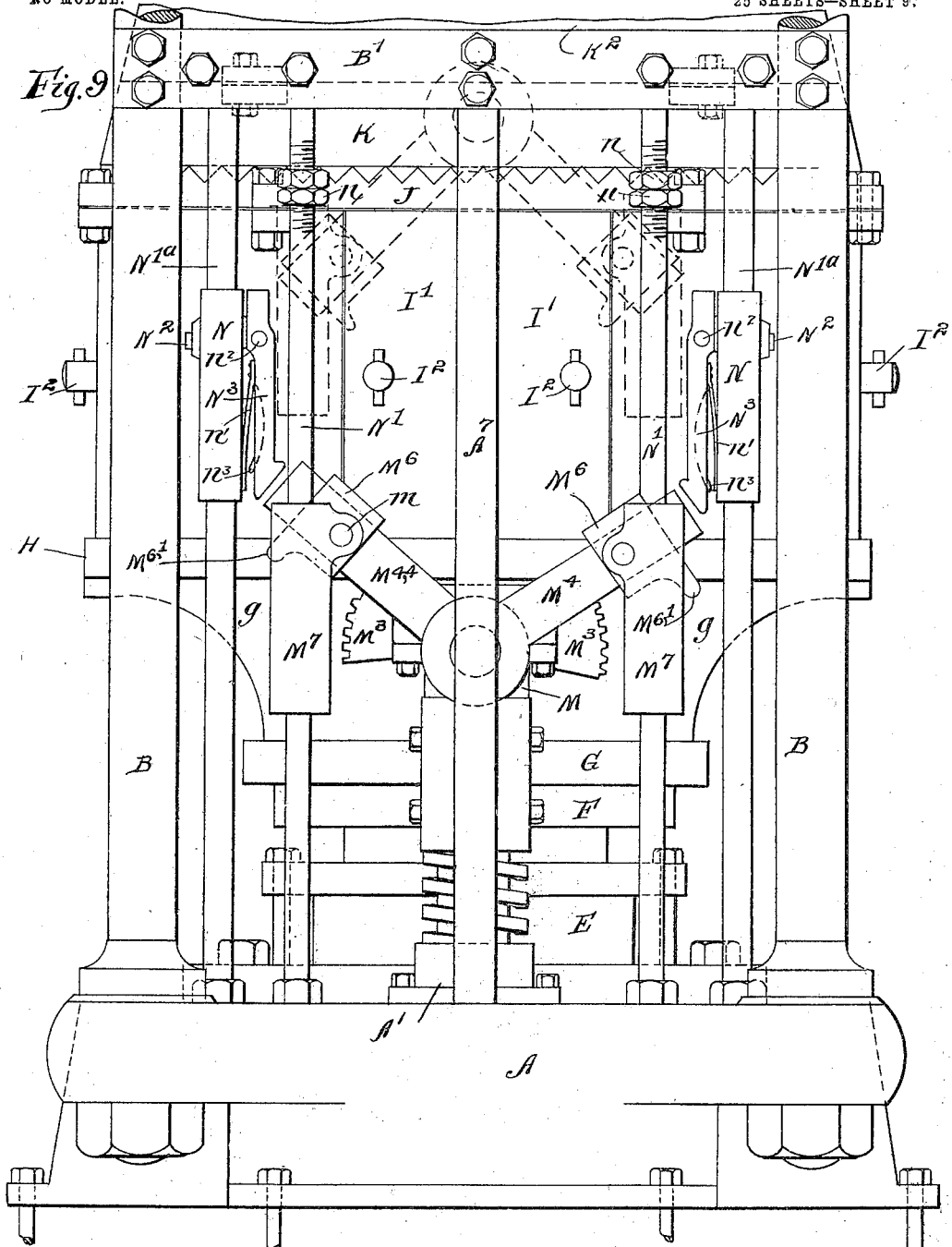

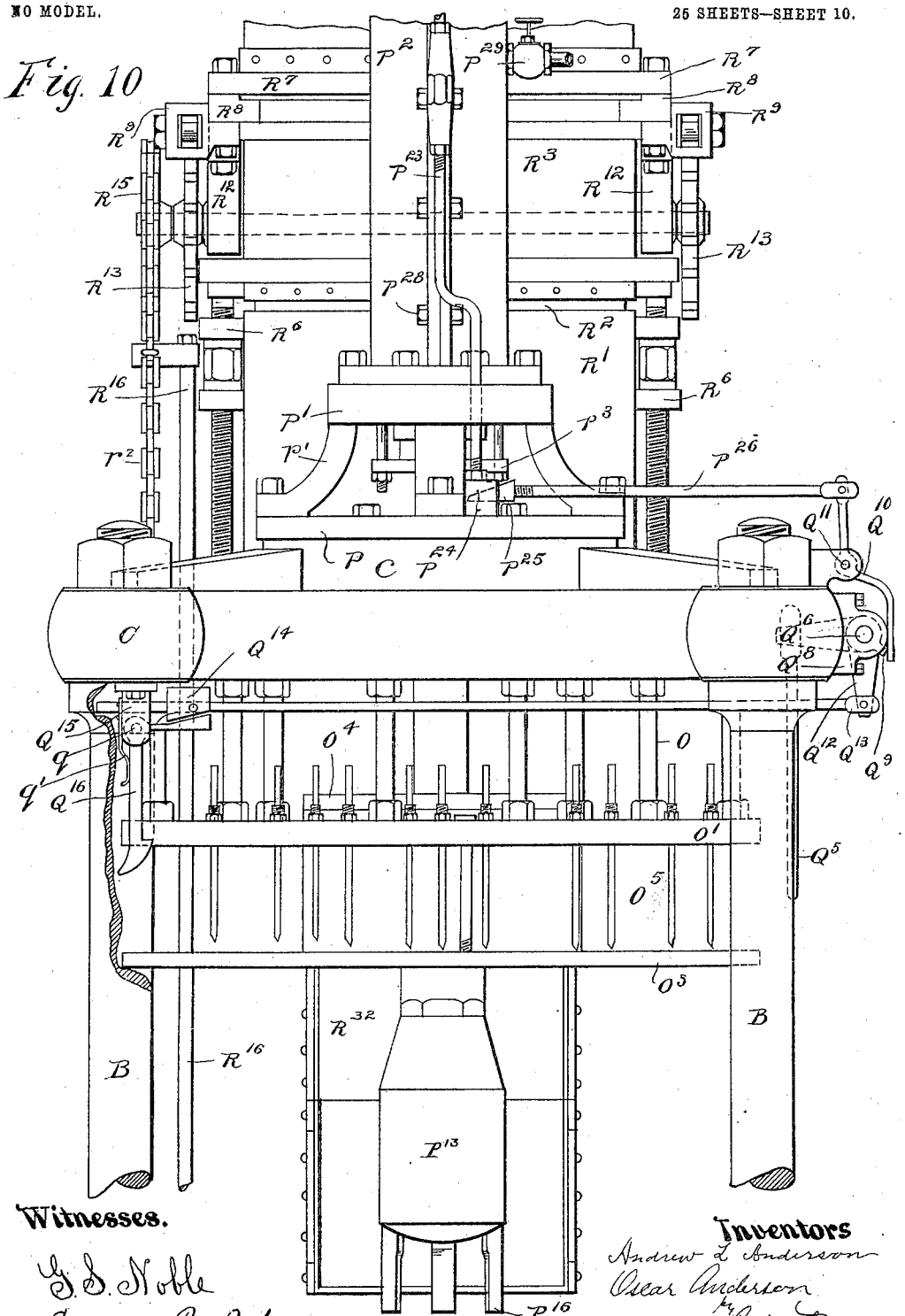

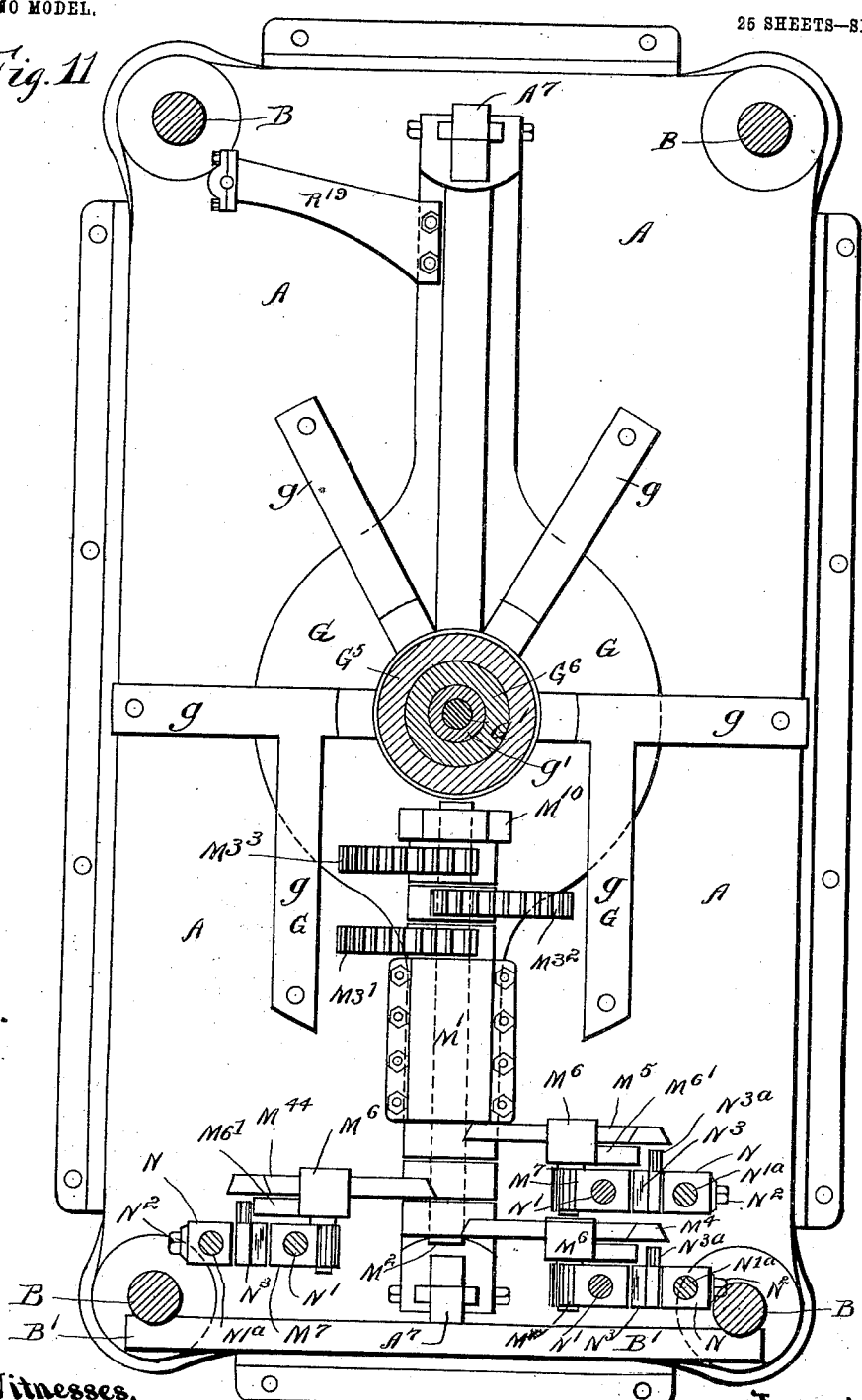

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 12.

Witnesses.
G. S. Noble
Eugene R. Weber

Inventors.
Andrew L. Anderson
Oscar Anderson
by
Morgan & Primstein
Att'ys

No. 726,492. PATENTED APR. 28, 1903.
A. L. & O. ANDERSON.
MOLDING MACHINE.
APPLICATION FILED SEPT. 16, 1901.

NO MODEL. 25 SHEETS—SHEET 13.

Witnesses.
G. S. Noble
Eugene R. Weber

Inventors,
Andrew L. Anderson
Oscar Anderson
by Morgan J. Rubinstein
Att'ys

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 14.
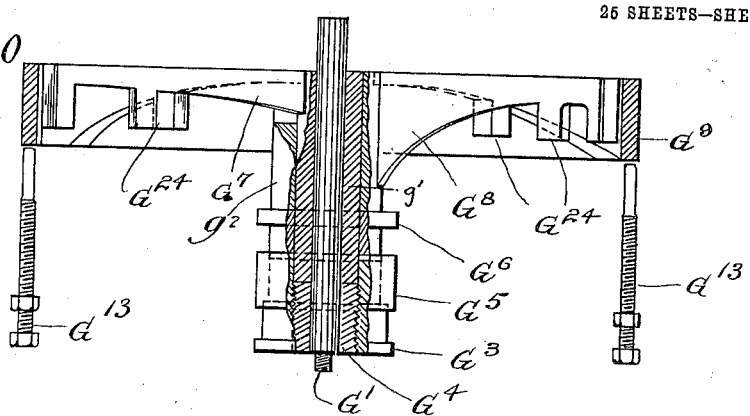
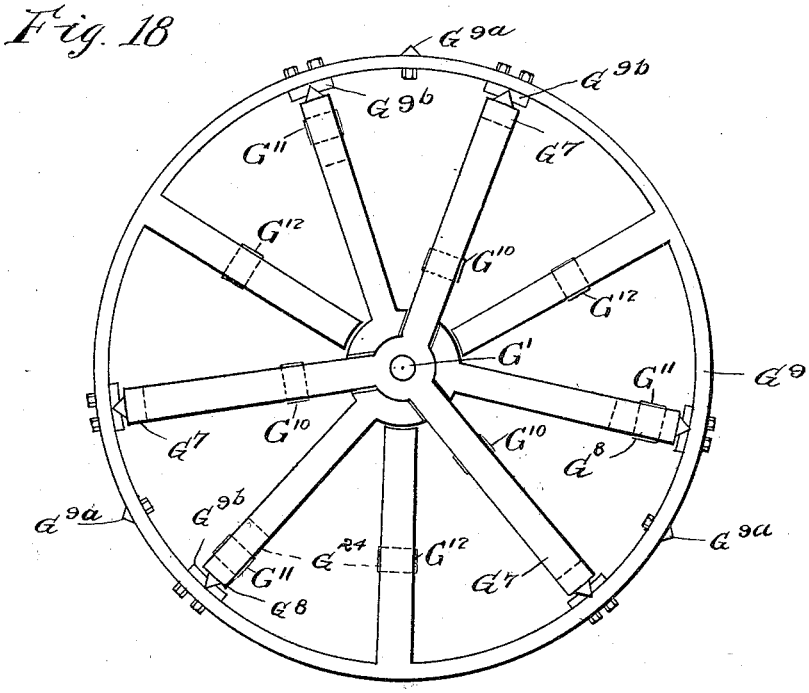
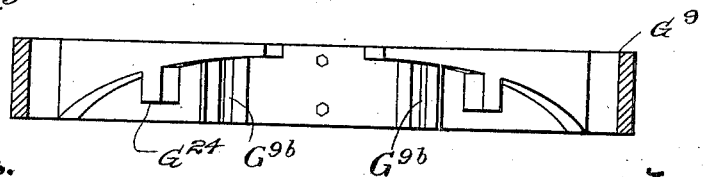
Witnesses.
Inventors.

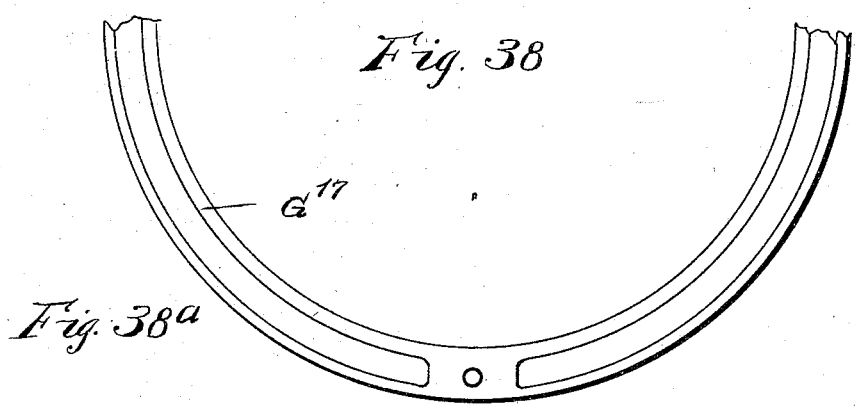
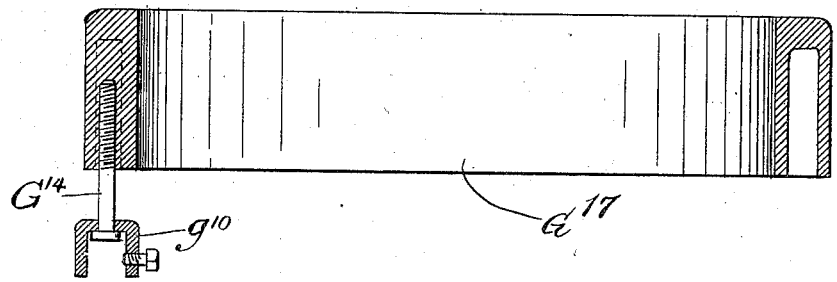
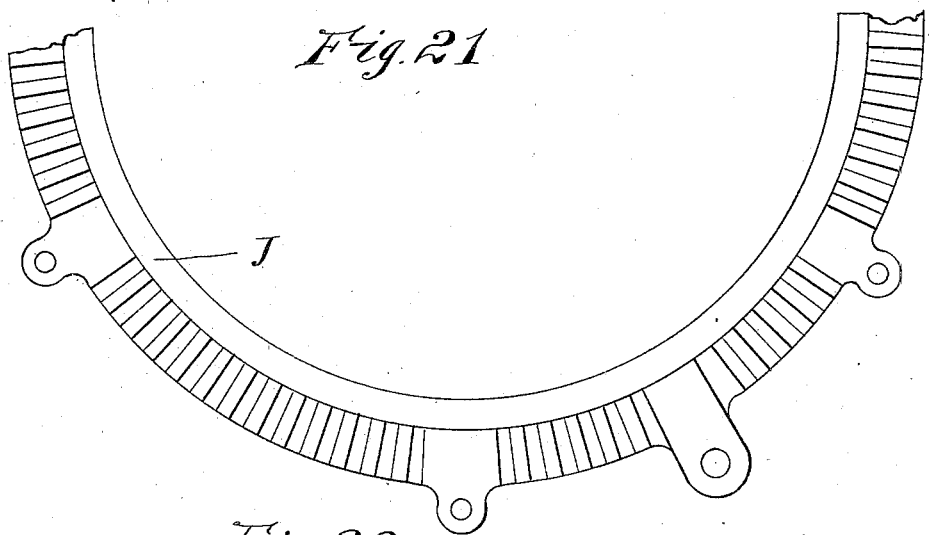

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 16.
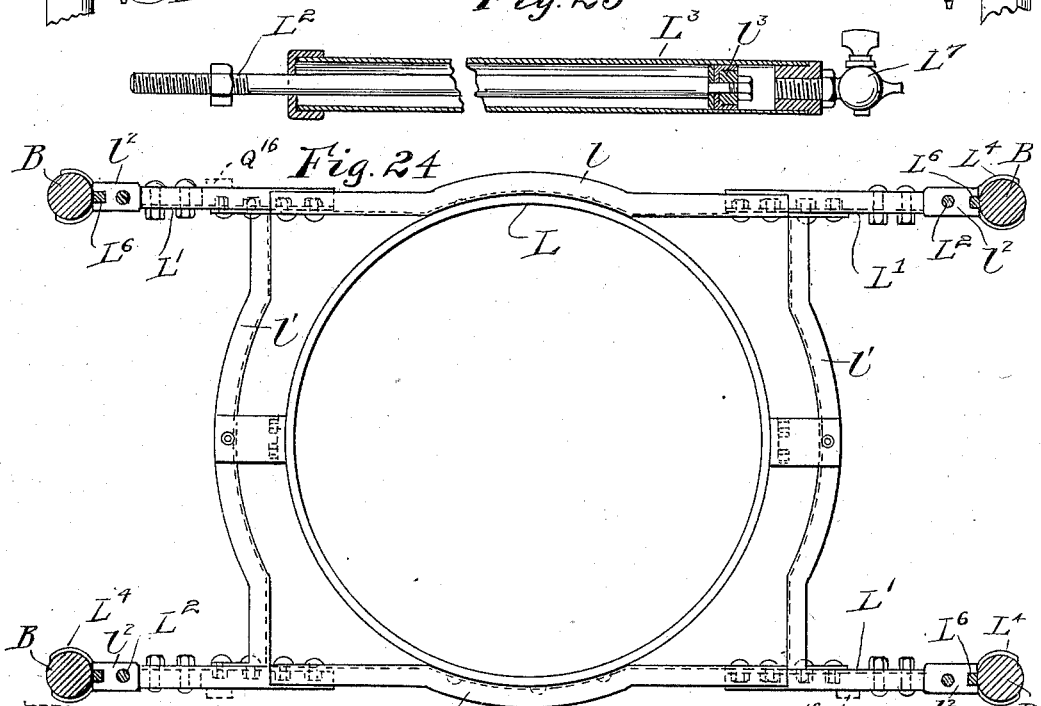

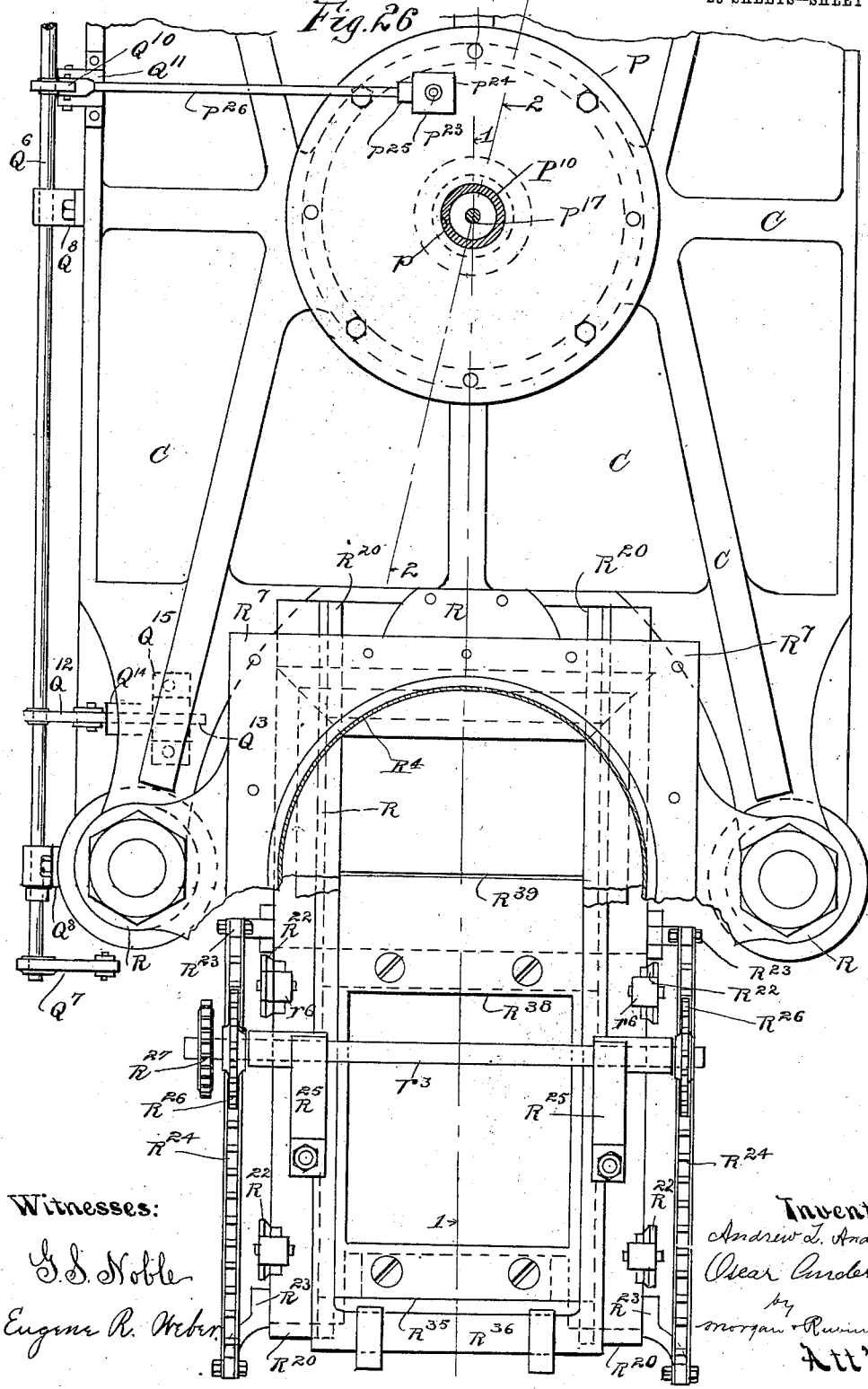

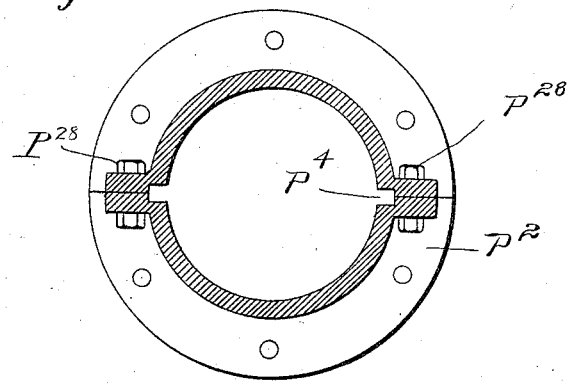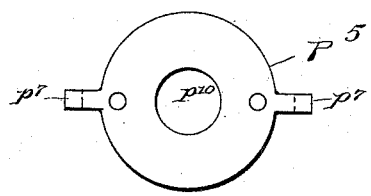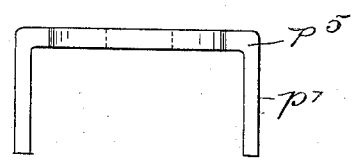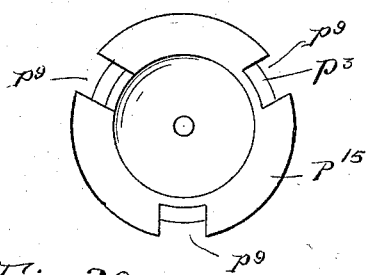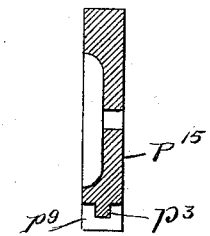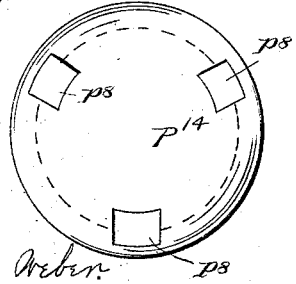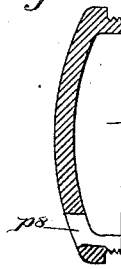

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 19.
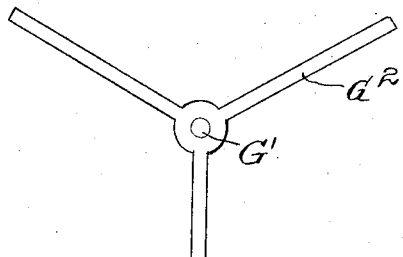
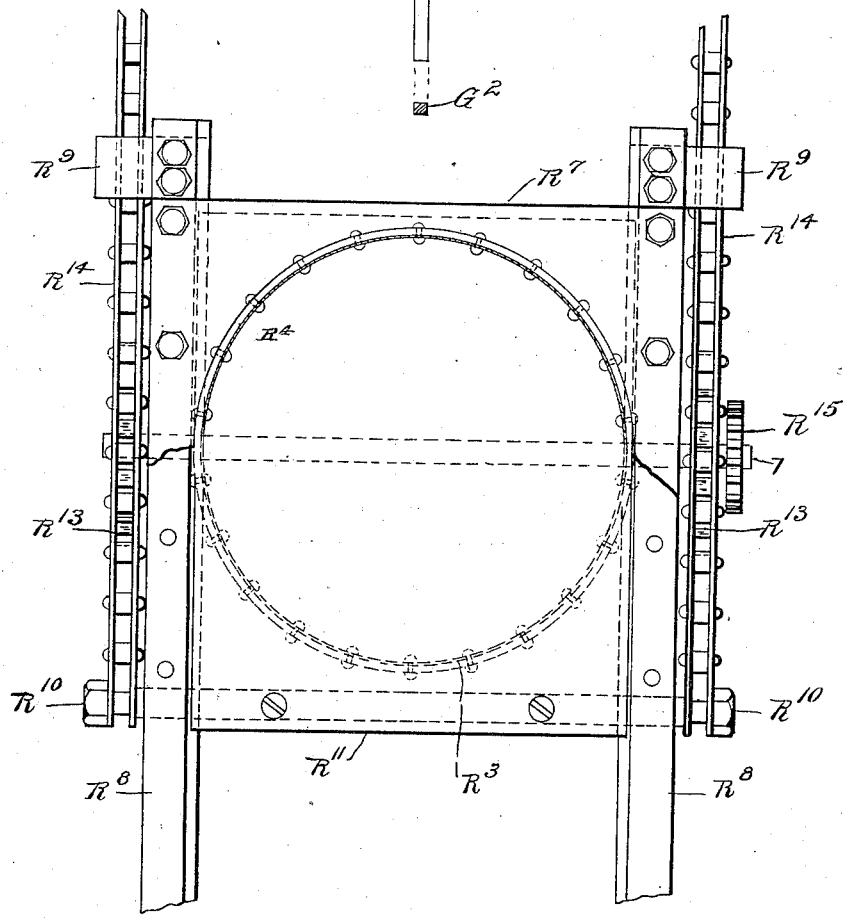

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 20.
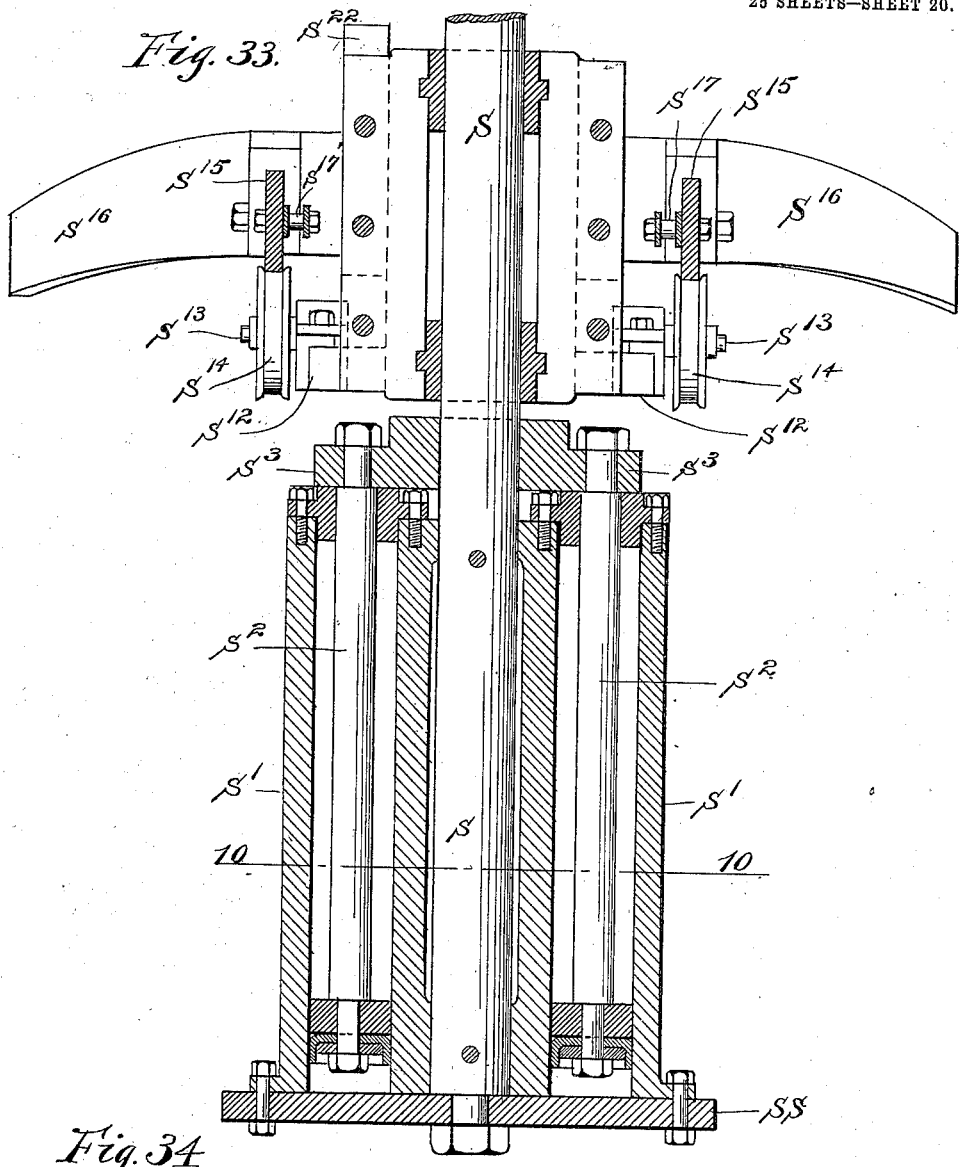
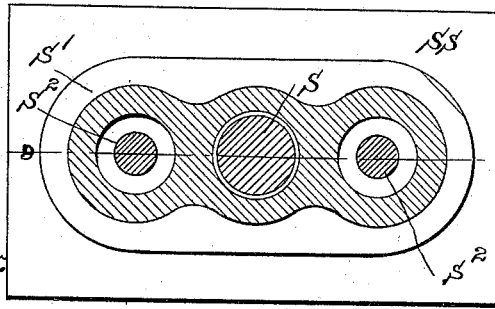
Witnesses:
G. S. Noble
Eugene R. Weber
Inventors
Andrew L. Anderson
Oscar Anderson
by Morgan & Rubinstein
Att'ys

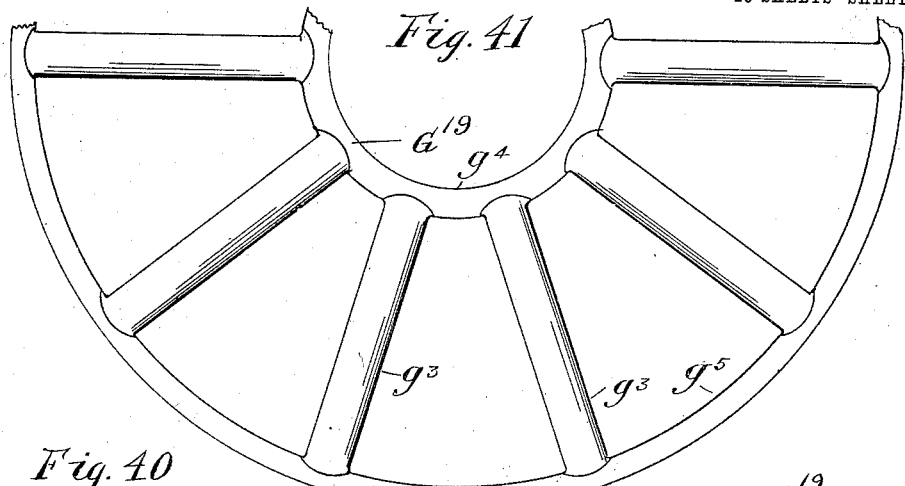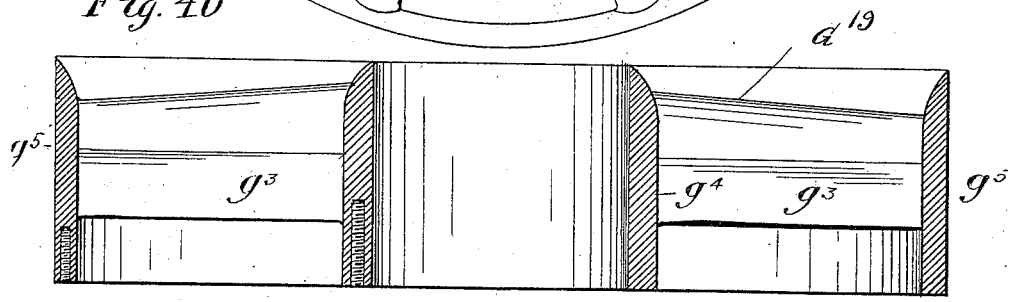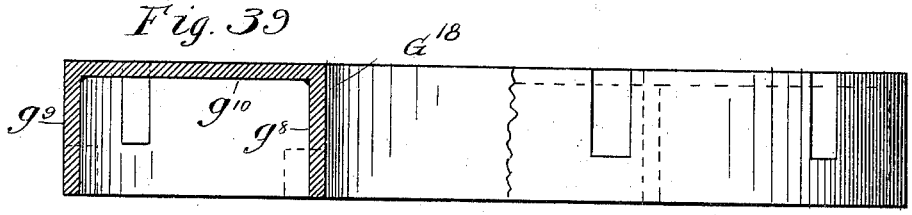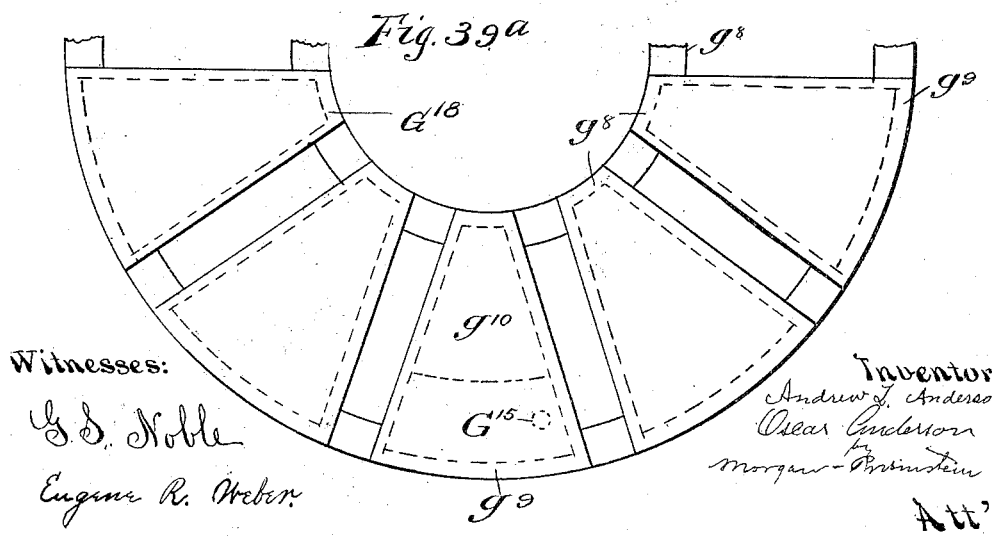

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 23.

Witnesses:
G. S. Noble
Eugene R. Weber

Inventors,
Andrew L. Anderson
Oscar Anderson
by
Morgan Rubinstein
Att'ys

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 24.
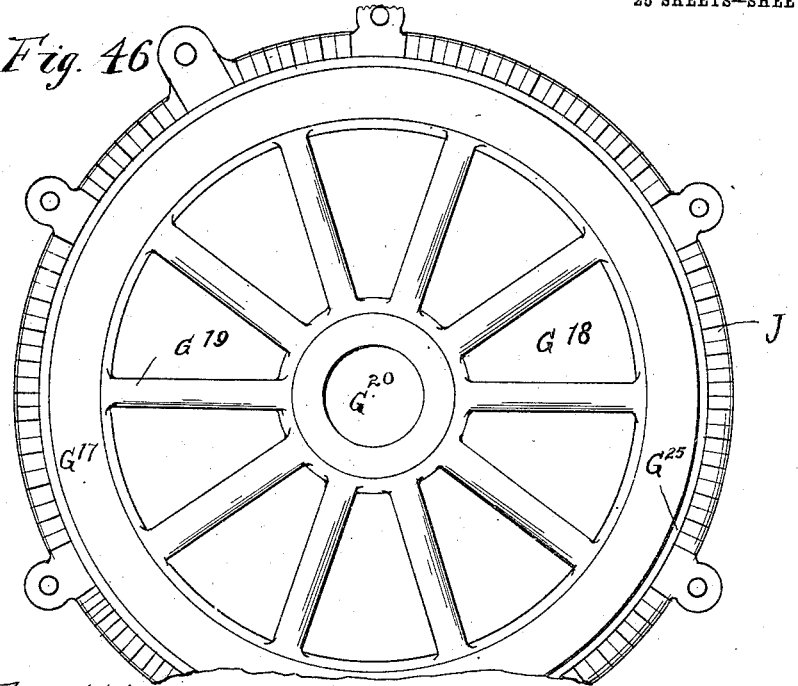
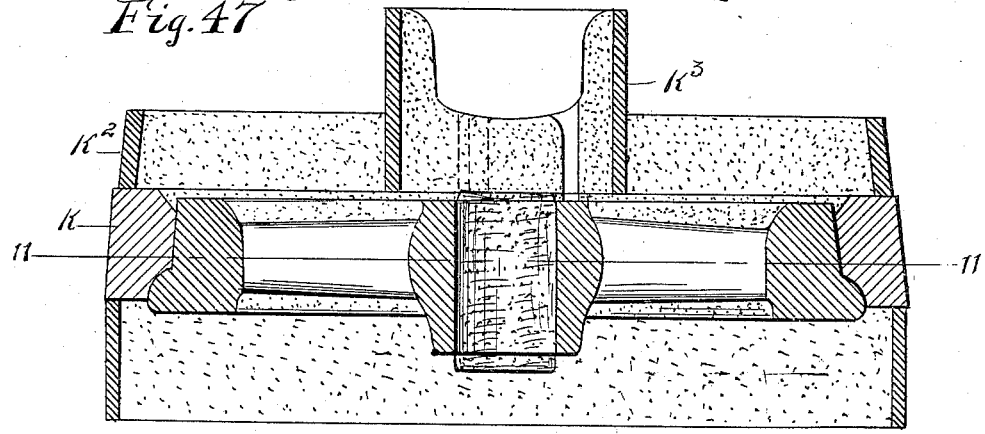

No. 726,492. PATENTED APR. 28, 1903.
A. L. & O. ANDERSON.
MOLDING MACHINE.
APPLICATION FILED SEPT. 16, 1901.
NO MODEL. 25 SHEETS—SHEET 25.

Witnesses:
G. S. Noble
Gertrude Bryce

Inventors,
Andrew L. Anderson
Oscar Anderson
by Poole & Brown
their Attorneys

UNITED STATES PATENT OFFICE.

ANDREW L. ANDERSON AND OSCAR ANDERSON, OF CHICAGO, ILLINOIS.

MOLDING-MACHINE.

SPECIFICATION forming part of Letters Patent No. 726,492, dated April 28, 1903.

Application filed September 16, 1901. Serial No. 75,657. (No model.)

*To all whom it may concern:*

Be it known that we, ANDREW L. ANDERSON and OSCAR ANDERSON, citizens of the United States, residing at No. 1100 West Thirteenth street, in the city of Chicago, county of Cook, and State of Illinois, have invented certain new and useful Improvements in Molding-Machines, of which the following is a specification.
This invention relates to molding-machines for making sand molds of that class in which the patterns are moved into and out of a flask from below, the sand is delivered to said flask from above the same, and in which the patterns are forced upwardly into the sand by pressure applied to such patterns from below the flask.

The object of our invention is to improve the construction of machines of the class above referred to in several particulars, as will hereinafter appear; and the invention consists in the matters hereinafter described, and pointed out in the appended claims.

Figure 2:
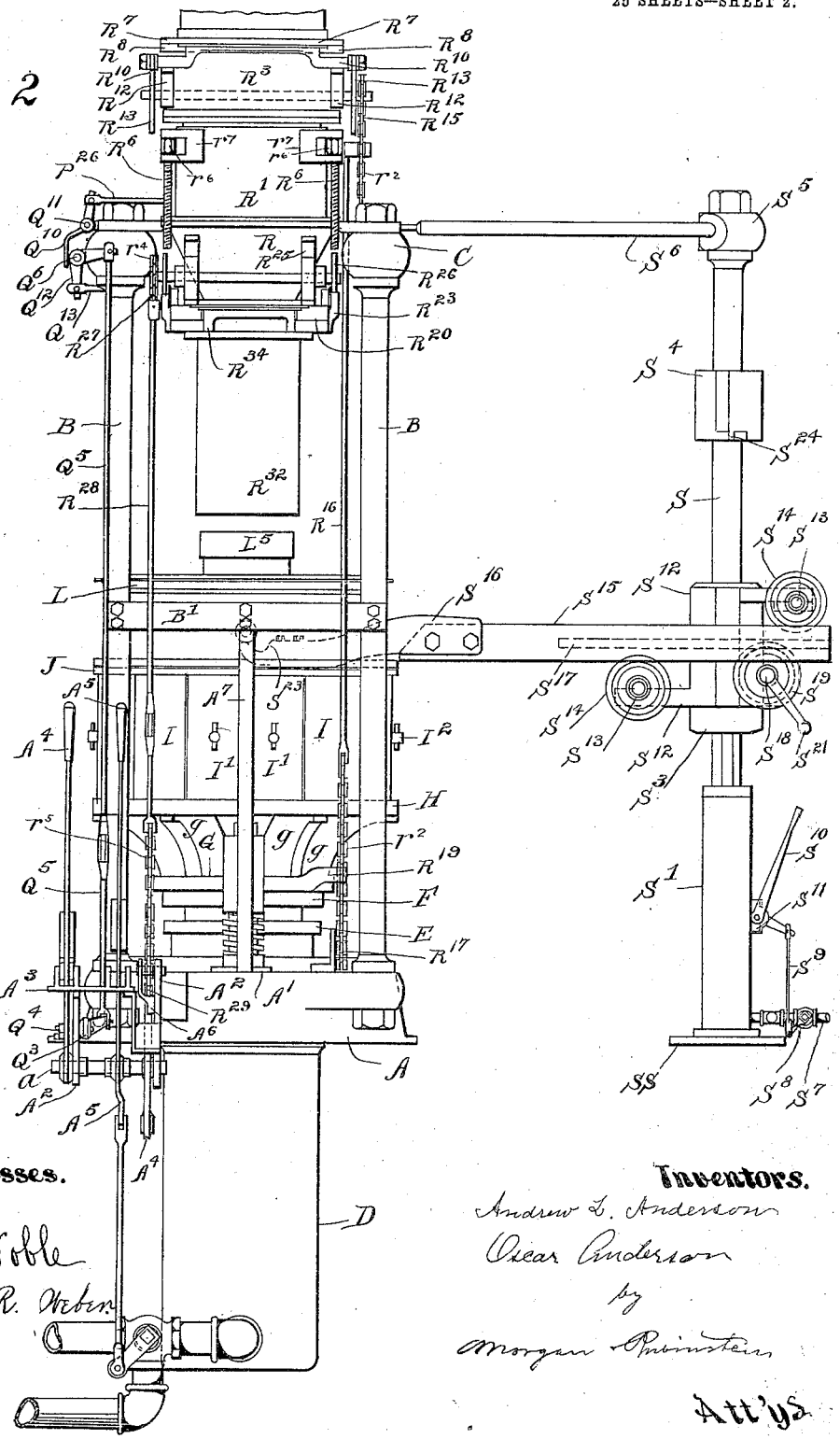
Figure 3:
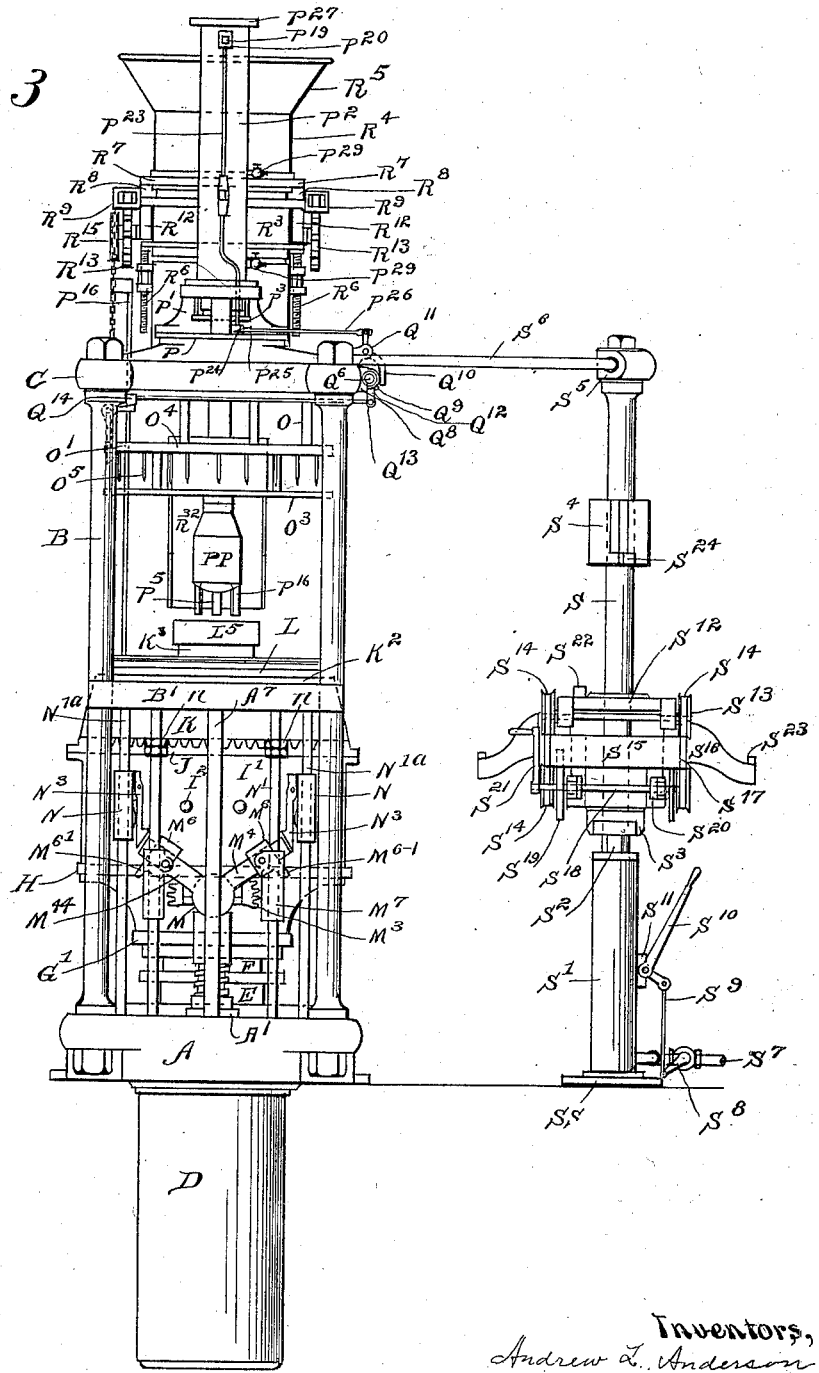
Figure 4:
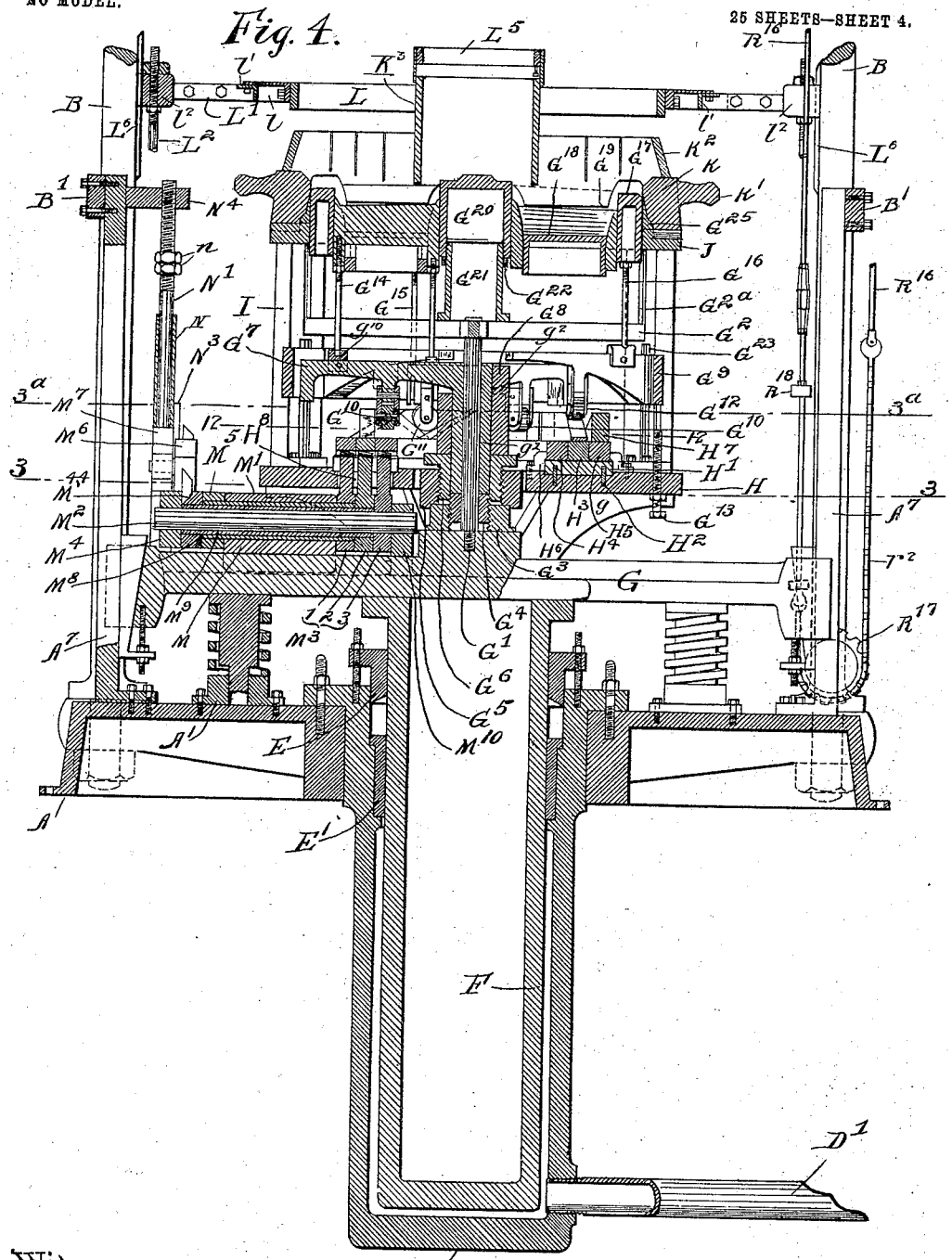
Figure 5:
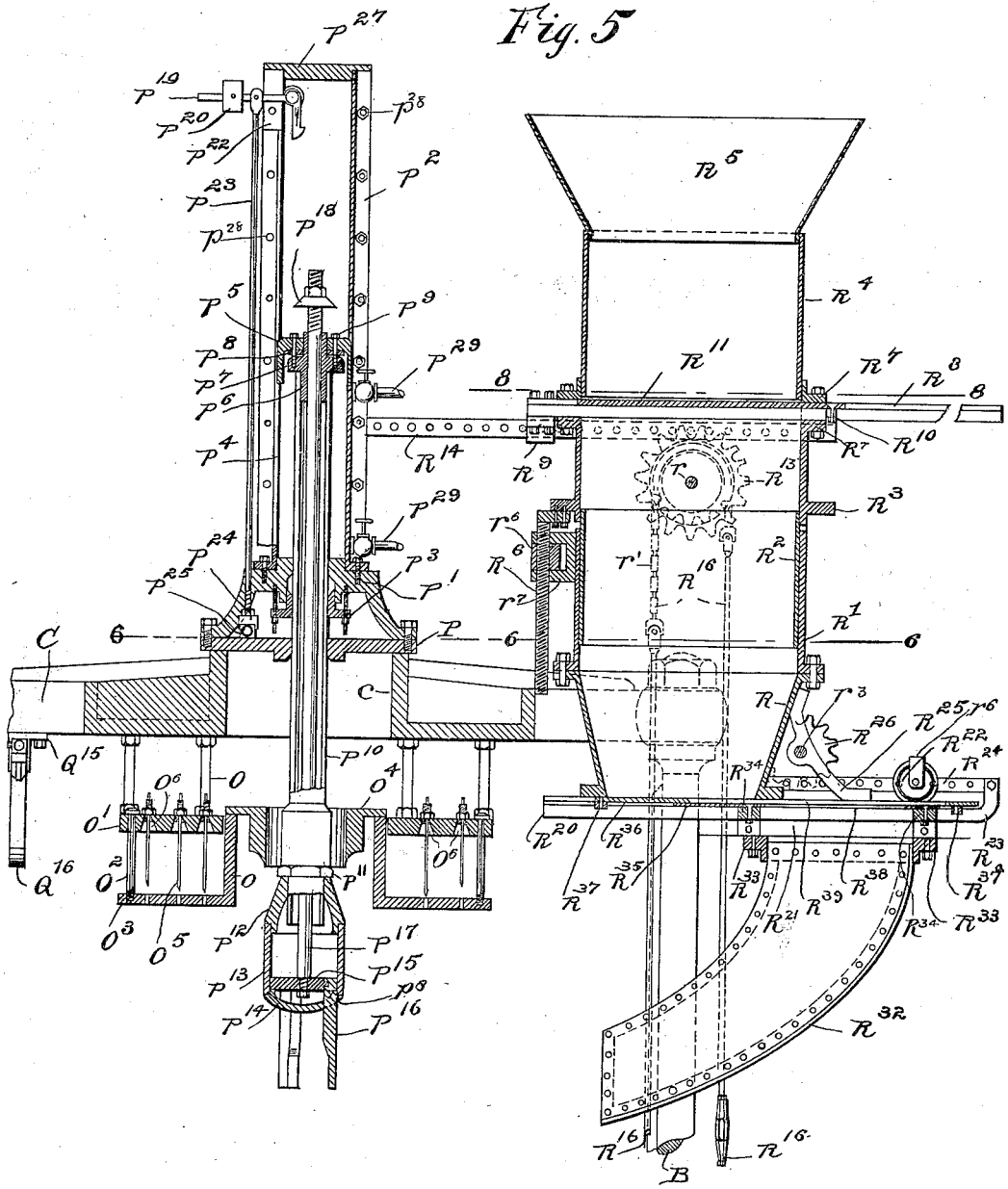
Figure 6:
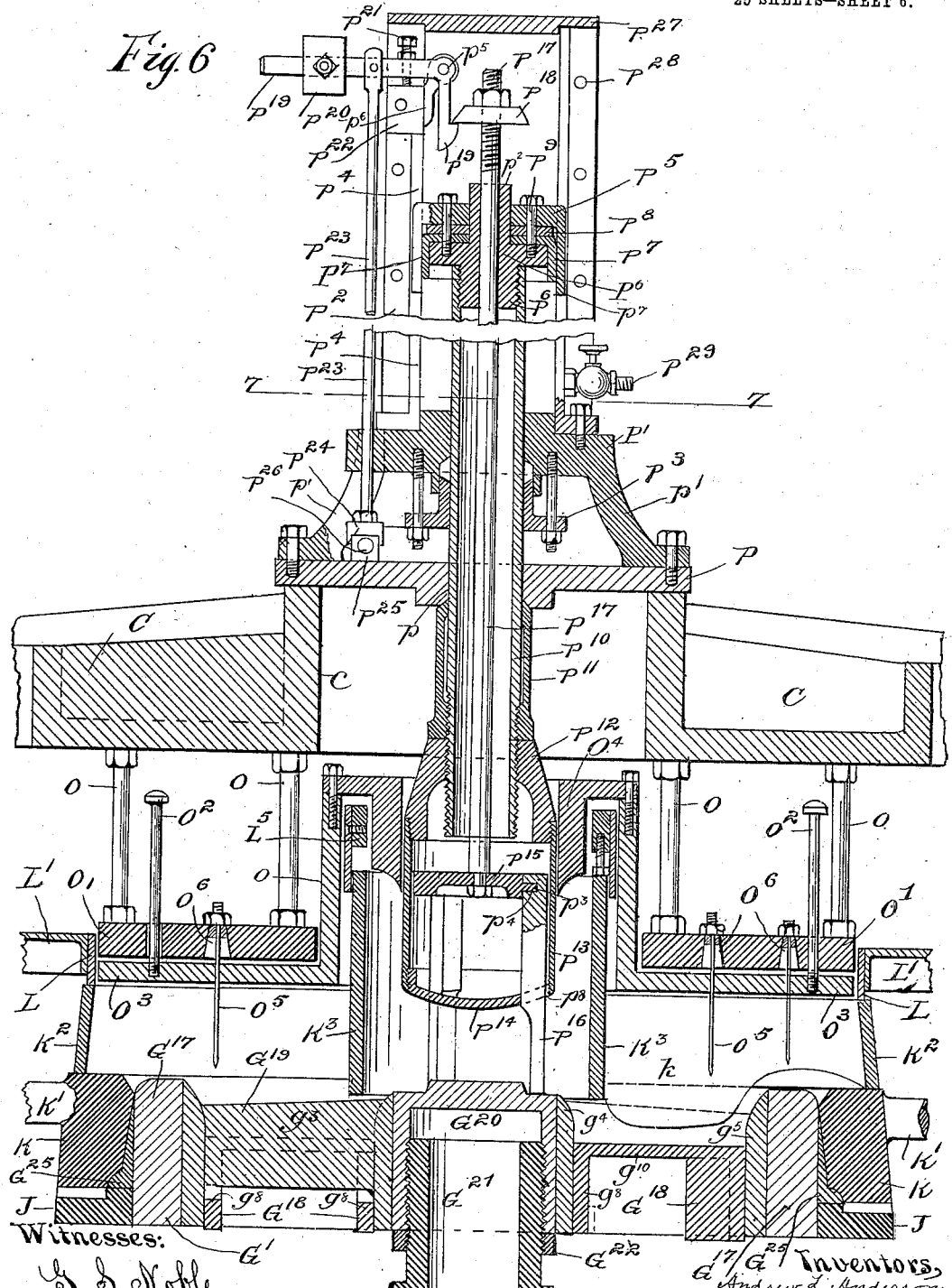
Figure 7:
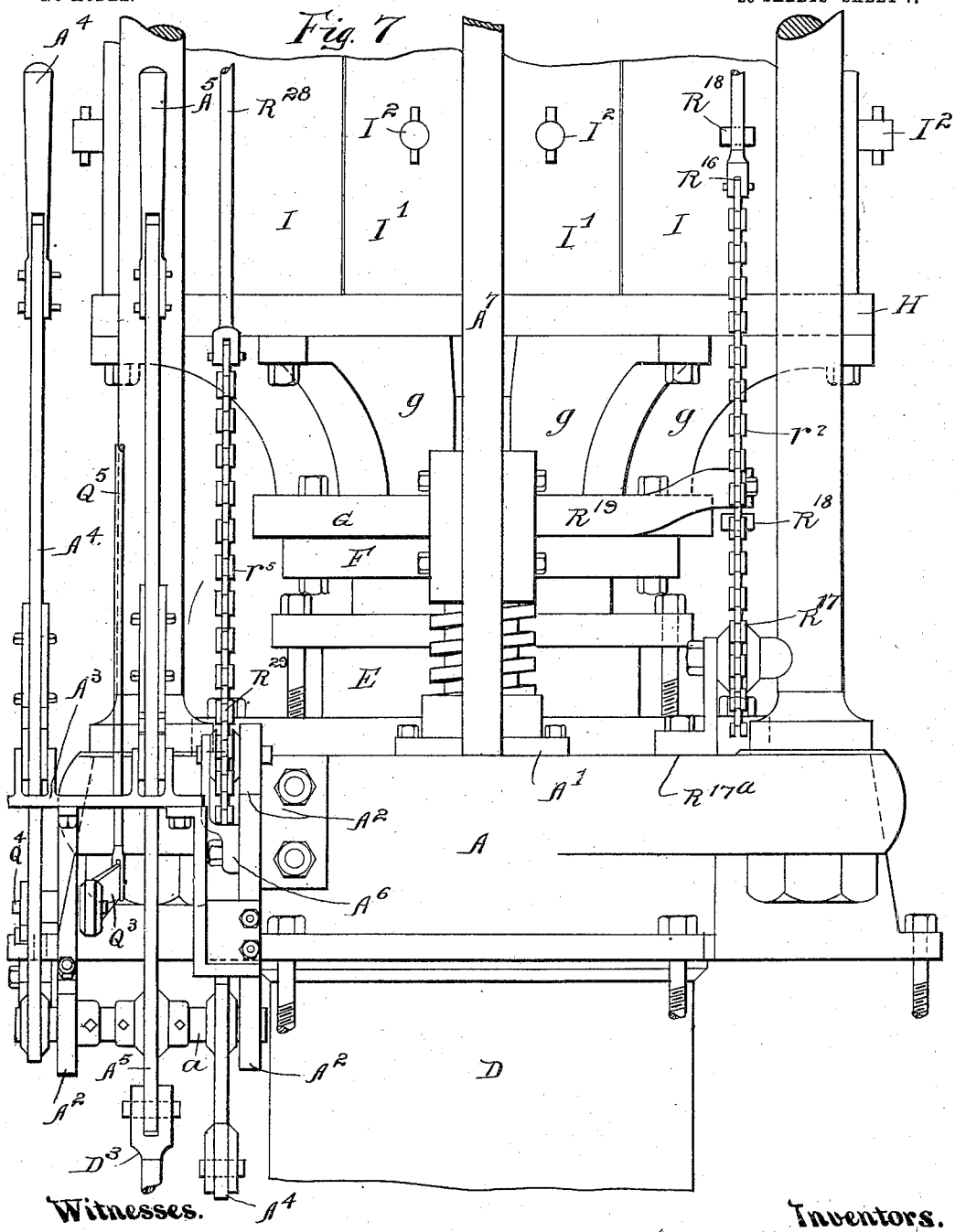
Figure 8:
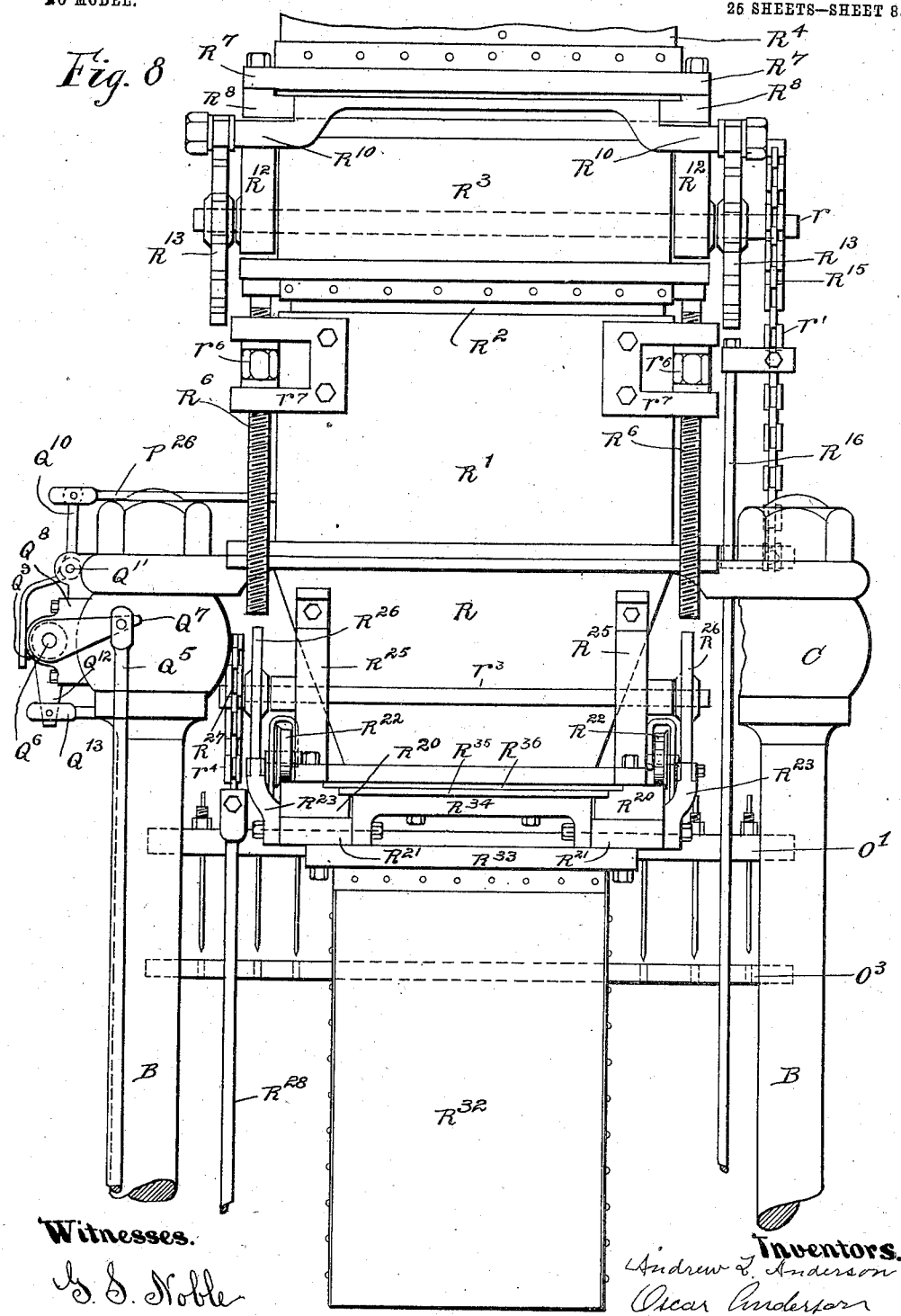
Figure 12A:
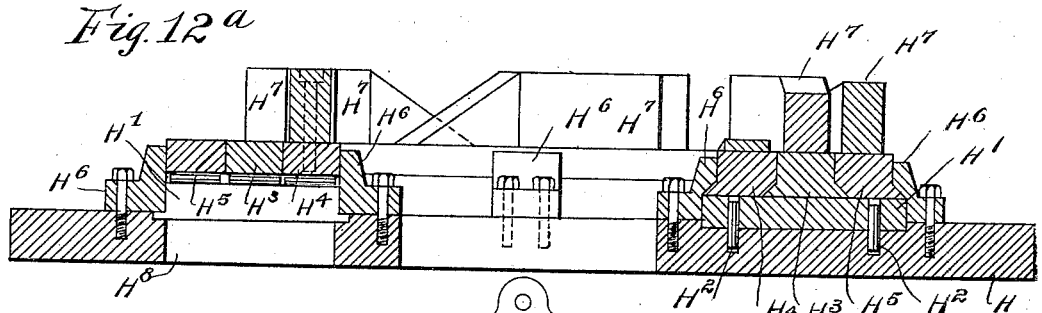
Figure 12:
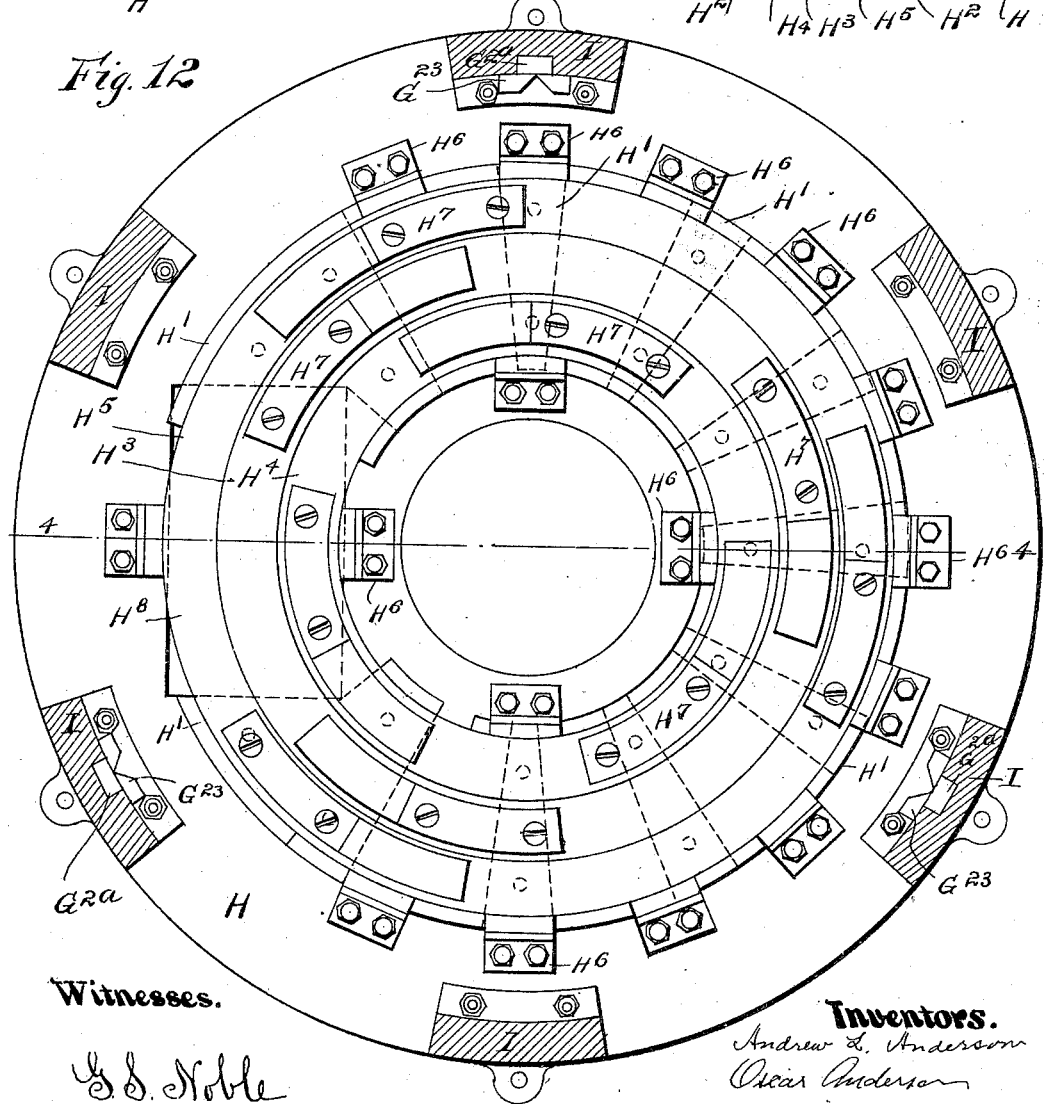
Figure 13:
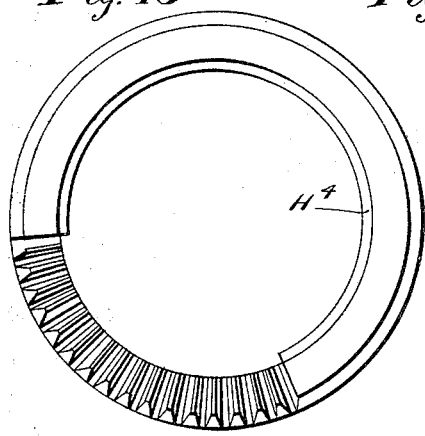
Figure 13A:
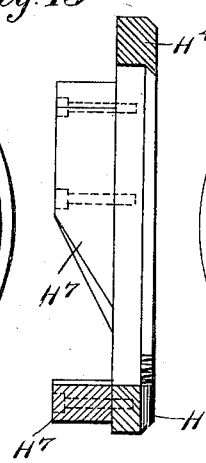
Figure 13B:
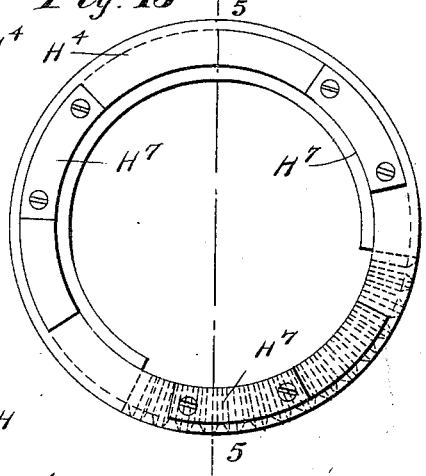
Figure 16:
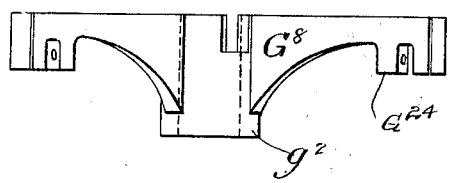
Figure 14:
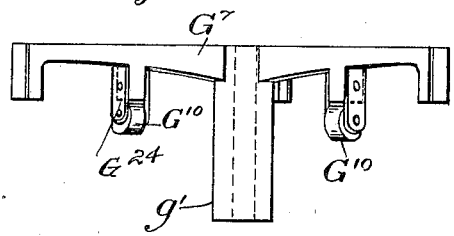
Figure 17:
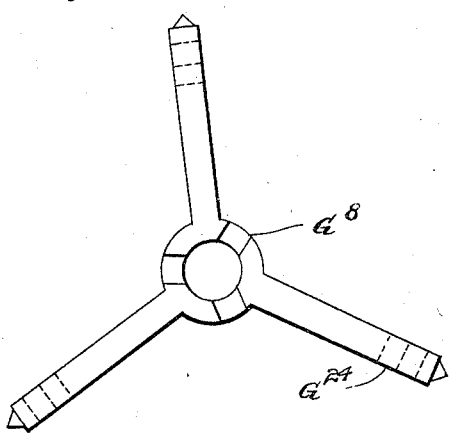
Figure 15:
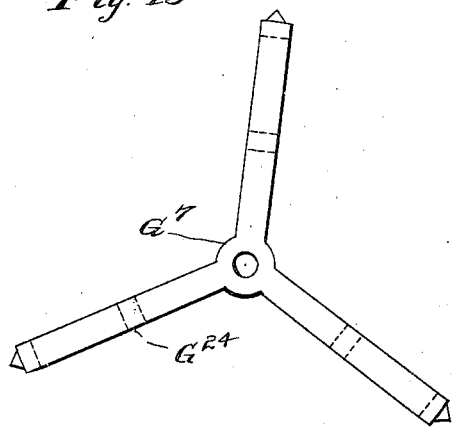
Figure 35:
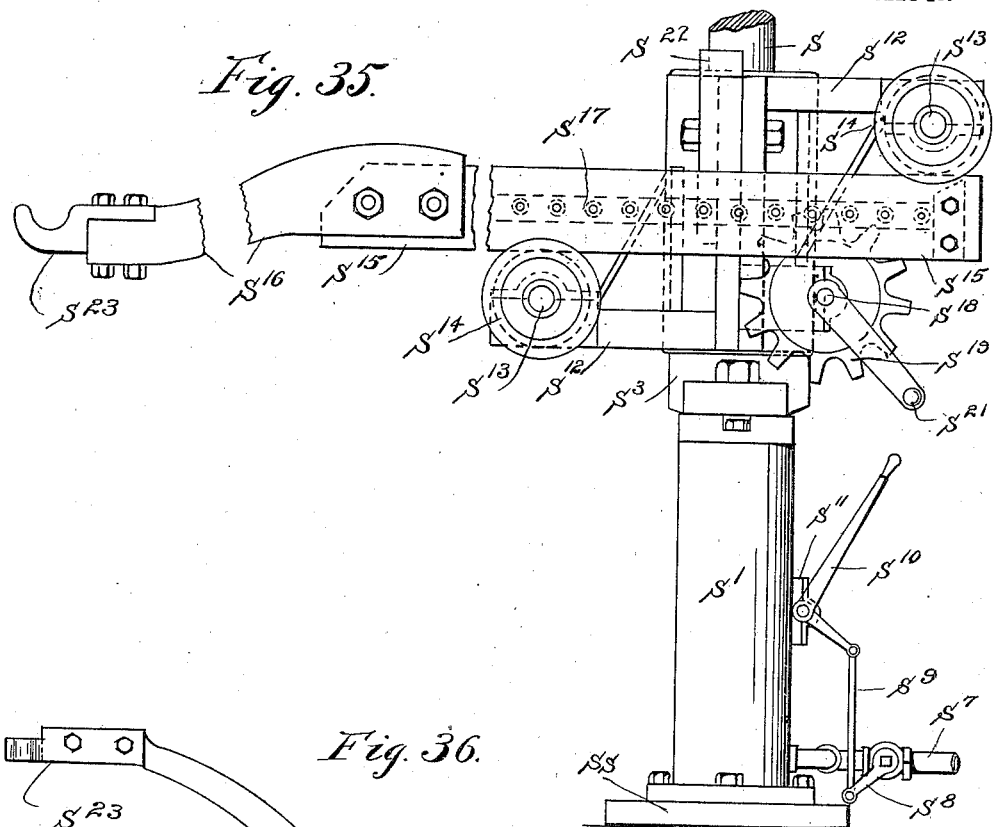
Figure 36:
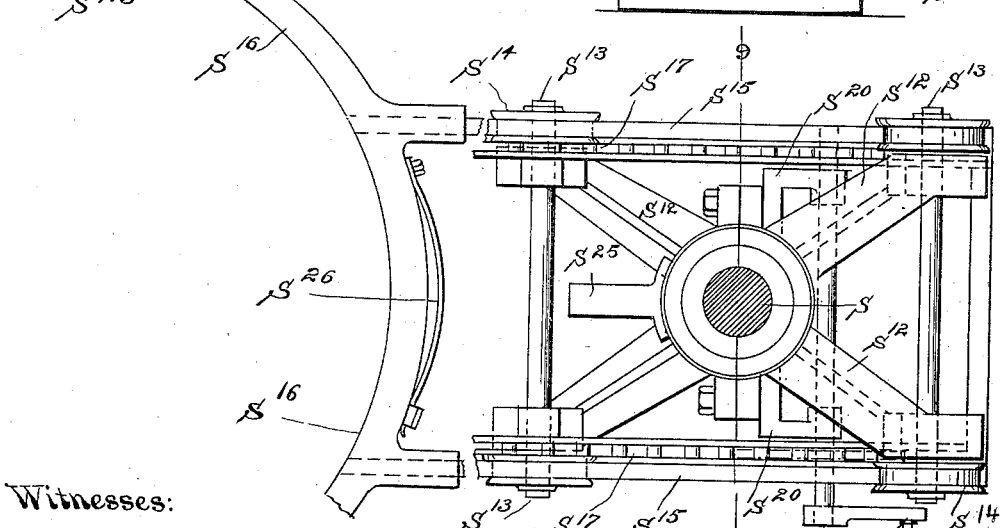
Figure 45:
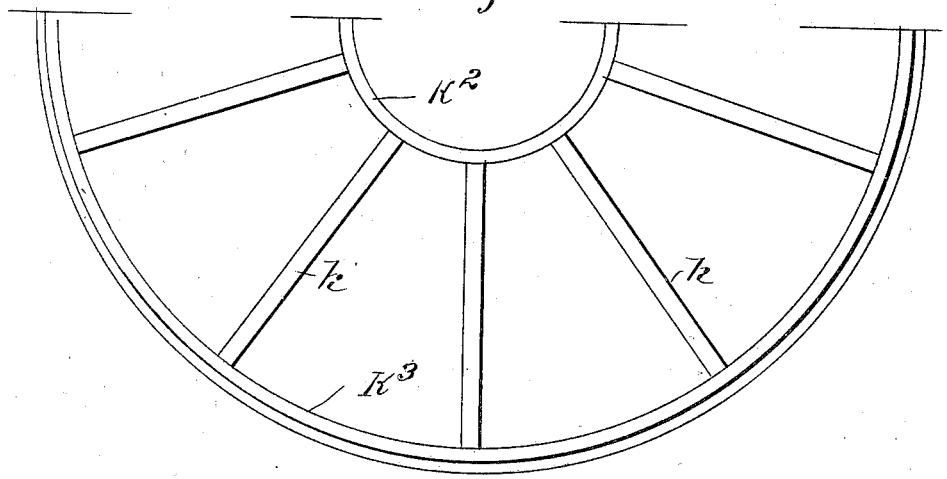
Figure 44:
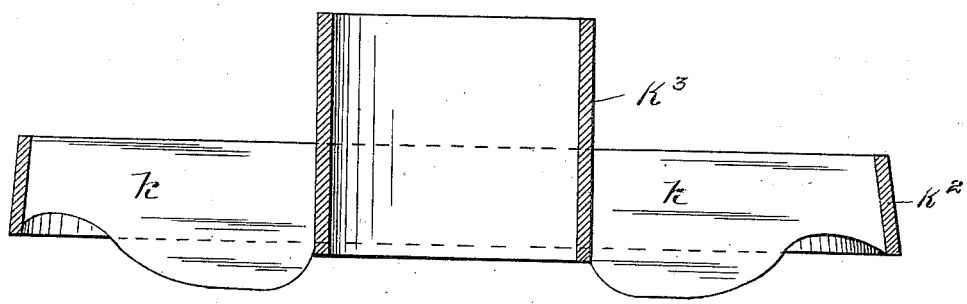
Figure 43:
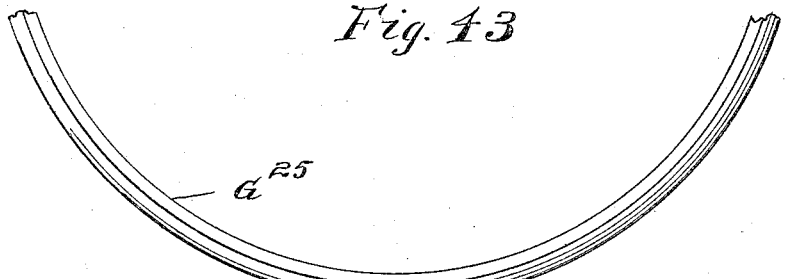
Figure 42:
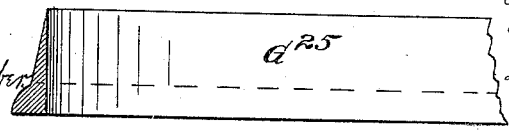
Figure 48:
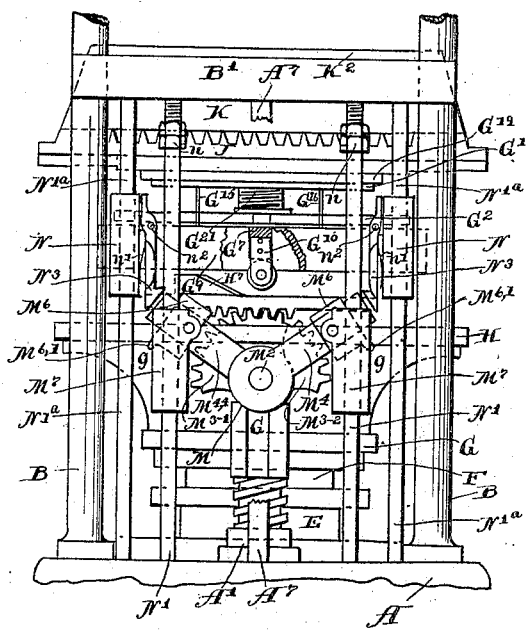
Figure 49:
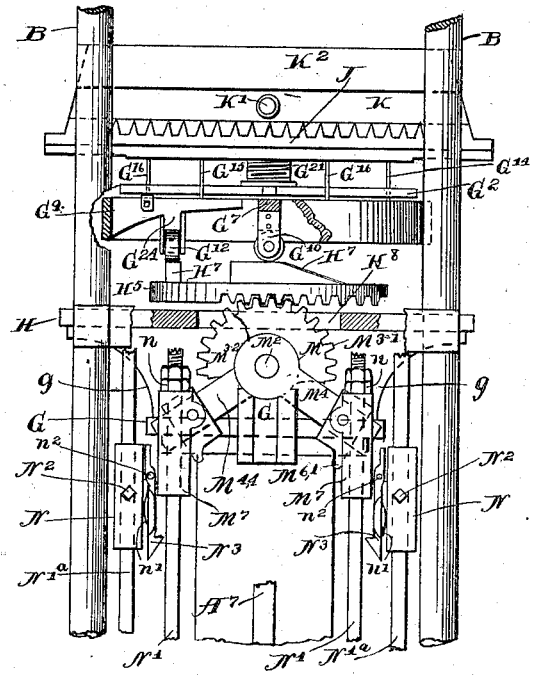

In the accompanying drawings, which illustrate one practical embodiment of the features constituting our invention, Figure 1 is a view in front elevation of a machine embodying our invention, including a sand-reservoir and sand-supplying mechanism. Fig. 2 is a view in end elevation of the right-hand end of the machine, showing also a crane located adjacent to the machine for lifting the flask when inserting it in the machine and taking the finished mold from the machine. Fig. 3 is a view in end elevation of the left-hand end of the machine, showing the crane with the crane-arm swung out from the machine. Fig. 4 is a view in central vertical section of the parts constituting the lower operative portion of the machine, said section being taken on the line 1 1 of Fig. 26. Fig. 5 is a similar vertical section of the upper operative parts of the machine, showing also the sand-receptacle, taken on the line 1 1 of Fig. 26. Fig. 6 is an enlarged sectional view of the upper part of the machine, taken on the vertical plane indicated by the line 2 2 of Fig. 26, illustrating the position of the parts when the pattern is in its highest position. Fig. 7 is a view in elevation, on an enlarged scale, of the parts at the lower portion of the machine. Fig. 8 is a view in elevation, on an enlarged scale, of the right-hand side of the machine, showing the upper part thereof, together with the sand-receptacle. Fig. 9 is a view in elevation of the left-hand side of the lower part of the machine, showing the devices for actuating the pattern-lifting mechanism. Fig. 10 is a view in elevation of the left-hand side of the machine, showing the upper part thereof. Fig. 11 is a plan section taken upon the line 3 3 of Fig. 4. Fig. 12 is a detail plan section taken on line 12 12 of Fig. 4, showing the several cam-rings by which the sections of the patterns are actuated, together with the supporting means for said cam-rings. Fig. $12^a$ is a vertical section of the parts shown in Fig. 12, taken on line 4 4 of Fig. 12. Fig. 13 is a face view of one of the cam-rings shown in Fig. 12 as seen from beneath. Fig. $13^a$ is a view in cross-section of the cam-ring shown in Fig. 13, taken on line 5 5 of Fig. $13^b$. Fig. $13^b$ is a top or plan view of the parts shown in Figs. 13 and $13^a$. Figs. 14 and 15 are side and plan views of one of the spider-frames by which the pattern-sections are supported. Figs. 16 and 17 are side and plan views of another of said spider-frames. Fig. 18 is a detail plan view of the several spider-frames when associated in operative positions. Fig. 19 is a view in cross-section of the annular spider-frames shown in Fig. 18. Fig. 20 is a detail cross-section of the several spider-frames, together with parts which immediately support the same and are associated therewith. Fig. 21 is a detail plan view of the supporting means by which the flask is directly sustained. Fig. 22 is a view in side elevation showing a fragment of the ring illustrated in Fig. 21. Fig. 23 is a view in side elevation of the sand-ring and devices by which the same is supported. Fig. 24 is a view in horizontal section showing in plan view the sand-ring and other parts illustrated in Fig. 23. Fig. 25 is a view of one of the dash-pots by which the descent of the sand-ring is controlled, the same being shown in central longitudinal section. Fig. 26 is a sectional plan view taken on the horizontal plane indicated by the line 6 6 of Fig. 5, parts above the sand-hopper being broken away to show the sand-feeding mechanism. Fig. 27 is a view in cross-section of the cylinder which controls the descent of the sprue-pattern plunger. Fig. 28 is a plan view of the cross-head in said cylinder. Fig. 28ᵃ is a view in side elevation of the cross-head shown in Fig. 28. Fig. 29 is a plan view of the bottom cap of the sprue-pattern plunger. Fig. 29ᵃ is a view in cross-section of the said bottom cap shown in Fig. 29. Fig. 30 is a plan view of a disk in the sprue-pattern plunger which holds and operates the sprue-patterns. Fig. 30ᵃ is a view in cross-section of the disk shown in Fig. 30. Fig. 31 is a perspective view of one of the sprue-pattern bars. Fig. 32 is a sectional plan view of the sand-door frame and associated parts, taken on the plane indicated by the section-line 8 8 of Fig. 5. Fig. 33 is a sectional view of the lower part of the crane shown in Figs. 1 and 2, taken on the vertical plane indicated by the line 9 9 of Figs. 34 and 36. Fig. 34 is a horizontal section taken on line 10 10 of Fig. 33. Fig. 35 is a side elevation of the crane. Fig. 36 is a plan view of the crane. Fig. 37 is a plan view of one of the spider-frames. Fig. 38 is a plan view of one of the pattern rings or sections. Fig. 38ᵃ is a sectional view of the same. Fig. 39 is a view, partially in side elevation and partially in central vertical section, of a segmental pattern-plate. Fig. 40 is a central vertical section of a pulley-pattern. Fig. 41 is a fragmentary plan view of the pattern shown in Fig. 40. Fig. 42 is a view in cross-section of a pattern-ring which forms the flange and tread of the wheel. Fig. 43 is a plan view of the part of the ring shown in Fig. 42. Fig. 44 is a view in central vertical section of the flask. Fig. 45 is a plan view of one-half of the flask shown in Fig. 44. Fig. 46 is a detail plan view showing the flask and supporting-ring of the machine, together with a complete pattern resting thereon. Fig. 47 is a sectional view showing a completed mold with the cast wheel therein embracing a metal chill, two flasks, and the sand therein. Figs. 48 and 49 are detail side views of the devices for operating the pattern-sections, showing changed positions of the parts.

As shown in the accompanying drawings, the frame of the machine comprises a bed-plate A, Figs. 1, 4, and 11, which is of rectangular form, as seen in plan view, and is provided with a flange adapted for bolting to a suitable foundation. The corners of said bed-plate A are extended to support vertical columns B, Figs. 1, 3, 5, and 11, which are rigidly secured to said bed-plate. Attached to the upper ends of the columns B is a horizontal top plate C, Figs. 1, 6, 10, and 26. At the ends of the machine horizontal brace-rods B' extend between and are attached to the columns B. The parts above described constitute the main frame of the machine.

The bed-plate A is provided with a central aperture in which is secured the upper end of a cylinder D, Figs. 1 and 4, which is rigidly secured to the base-plate by bolts. Connected with said cylinder are pipes D' D⁴, through which a pressure fluid is admitted to and exhausted from said cylinder. Within the cylinder is a ram F, arranged to slide vertically therein through the action of the pressure fluid, the space between the upper open end of the cylinder and the said ram being closed by means of a gland E and packing-ring E' in the usual manner. The passage of the pressure fluid to and its escape from the cylinder is controlled by means of a valve D², which is connected by a rod D⁵ with an operating-lever A⁵, which is mounted on a pivot-rod a, supported in brackets A² A² on the base-plate A.

Attached to the upper end of the ram F is a cross-head G, Figs. 1, 4, and 11, said cross-head being provided with arms which extend across the machine and are engaged at their ends with vertical guide-standards A⁷, Figs. 2, 4, and 11, said guide-standards being bolted to the bed-plate A and to the horizontal braces B', Fig. 2. On the bed-plate beneath the arm of the cross-head are located buffer-springs A' A', adapted to cushion the cross-head in the descent of the latter.

The cross-head G is provided at its center with a cylindric elevation or hub and outside of said hub with vertically-arranged brackets g g, (shown more clearly in Fig. 11,) which serve to support a circular plate H, which is provided with a central aperture making the said plate of annular form, said plate being secured to the said brackets by bolts or otherwise, Figs. 1, 4, 7, 11, 12, and 12ᵃ. Between the central aperture of the plate H and its outer margin at one side of the plate is a rectangular aperture H⁸, Figs. 4, 12, and 12ᵃ. The said plate H forms a base or support on which rest the several parts of the machine by which the flask and pattern are supported and operated and which will now be described. Rising from said plate H and rigidly secured thereto are a plurality of vertical standards I, preferably six in number, Figs. 1, 2, 4, and 12. Resting on the tops of said standards I and bolted thereto is an annular plate or ring J, Figs. 1, 3, 4, 9, 21, and 22, which forms a support for the flask and on which the same rests during the formation of the mold. In the spaces between the plate H the flask-supporting plate J and the several standards I are located sheet-iron doors I', Figs. 1 and 2, which serve to form a housing or inclosure for the parts within the same, to be hereinafter described, said housing serving to exclude sand and dust from said parts.

In the upper surface of the plate H is formed an annular shallow groove or channel, Figs. 4, 12, and 12ᵃ, in which are located a series of radially-arranged blocks H', which are inwardly tapered at their side edges, the same being secured to the plate H by means of dowel-pins H². Said radial blocks form bearings or supports for a plurality of concentric rings H³ H⁴ H⁵, which rings are free to turn on said blocks. The center ring H⁴ has base-flanges arranged to extend beneath the outer rings, and said outer rings have external flanges which are engaged by a series of clamp-bearings $H^6$, Figs. 4, 12, and $12^a$, which are attached to the plate H and serve to hold the said rings in place. The upper faces of the said cam-rings are provided with cam projections, shown as having the form of cam-blocks $H^7$, having inclined or cam surfaces at one end thereof and top surfaces which are horizontal or parallel with the face of the plate H. On a portion of the under side of each of the rings $H^3$ $H^4$ $H^5$ are gear-teeth forming a curved rack, Figs. 13 and $13^a$, said gear-teeth being adapted to be engaged by gear-segments $M^{3\,1}$ $M^{3\,2}$ $M^{3\,3}$, Figs. 4 and 11, which are arranged to turn about a common axis of rotation located below the plate H and which extend upwardly through the rectangular aperture $H^8$ in the said plate.

The segmental gears $M^{3\,1}$ $M^{3\,2}$ $M^{3\,3}$ are supported and actuated as follows: A bearing M, Figs. 1, 4, and 11, is bolted to one of the arms of the cross-head G, the axis of said bearing being arranged radially with respect to the rings $H^3$, $H^4$, and $H^5$. In said bearing is mounted a sleeve $M^8$, Fig. 4, which is adapted to freely revolve in said bearing and on the inner end of which the segmental gear $M^{3\,1}$ is rigidly secured. Within the sleeve $M^8$ is another sleeve $M^9$, the inner end of which projects beyond the sleeve $M^8$ and to which the segmental gear $M^{3\,2}$ is rigidly secured. Within the sleeve $M^9$ is a shaft $M^2$, which is adapted to turn freely in said sleeve and on the inner end of which the segmental gear $M^{3\,3}$ is fixed. Inside of the gear $M^3$ said shaft has bearing in and is supported by a bearing-block $M^{10}$, Figs. 4 and 11. To the sleeves $M^8$ $M^9$ and the outer end of the shaft $M^2$ at the end of the bearing-block M opposite the segmental gears are secured three crank-arms $M^4$, $M^{4\,4}$, and $M^5$, Figs. 3, 9, 11, 48, and 49, which form parts of devices for actuating the segmental gears and cam-rings. Said arms are straight, and mounted to slide endwise thereon are collars $M^6$, the arms being shown as made flat with angular edges and the collars as provided with correspondingly-shaped openings to receive said arms. To the sliding collars $M^6$ are attached pivot-studs $m$, which have pivotal connection with vertically-movable blocks $M^7$, arranged to slide on upright guide-rods $N'$, which are attached at their lower ends to the bed-plate A and are secured at their upper ends to inwardly-extending brackets $N^4$, Fig. 4, bolted to the cross-head G. On the rods $N'$ above the blocks $M^7$ are located adjustable stops, herein shown as having the form of nuts $n$, applied to the upper parts of said rods, which are screw-threaded to receive said nuts. The stops formed by the nuts $n$ serve to limit the upward movement of the blocks $M^7$ and by arresting the upward movement of said blocks while the cross-head G and parts connected therewith are rising serve to swing or turn the crank-arms $M^4$, $M^{4\,4}$, and $M^5$ about their axes of rotation, and thus turn or rotate the shaft $M^2$, the sleeves $M^8$ $M^9$, and the three segmental gears attached to said shaft and sleeves.

The position of the arms $M^4$ $M^{4\,4}$ when the plate G is at the lower limit of its movement is shown in Figs. 9 and 35, said arms being at this time directed upwardly and outwardly from the shaft and sleeve to which they are attached. The position of said arms and connected parts when the said plate G is at the upper limit of its movement is shown in Fig. 49, the sliding blocks $M^7$ at this time being in contact with the nuts $n$ and the arms being downwardly inclined.

Outside of and adjacent to the side rods $N'$ are other like vertical guide-rods $N'^a$, which are attached to the frame of the machine in the same manner as are the rods $N'$. Mounted on said rods $N'^a$ are vertically-adjustable blocks N, the same being adapted to slide on the said rods and being held in a fixed position thereon during the operation of the parts by means of set-screws $N^2$, Figs. 9 and 11. Pivoted on the blocks N are hooks or detents $N^3$, the hooked ends of which depend from the pivots $n^2$ of the detents and are directed toward the sliding blocks $M^7$. Springs $n'$ are applied between the blocks N and the lower or free ends of the detents $N^3$, said springs operating to force said detents outwardly or into position for engagement with the blocks $M^7$. The hooked lower ends of said detents are, however, made oblique or inclined on their lower and inner faces or faces adjacent to the sliding blocks $M^7$, so that when said blocks rise they will push the detents backwardly and freely pass the same, the hooked ends of the detents being thrown forward by the springs into position to engage the lower ends of said sliding blocks $M^7$ after the blocks have passed above said hooked ends of the detent. Said blocks $M^7$ are arranged to rise somewhat above the hooked ends of the detent before coming in contact with the stop-nuts $n$, as clearly seen in dotted lines in Fig. 9, said detents being arranged to arrest the down movement of said blocks $M^7$ after they have moved downward some distance from their extreme upper position, for a purpose that will hereinafter appear.

The patterns employed in the operation of the machine herein described embrace a plurality of separately-movable parts or sections which are movable vertically with respect to the cross-head G, and devices are provided for giving movement separately to said parts or sections, which will now be described, it being understood that the particular machine herein shown is adapted for use in connection with a pattern consisting of three of such parts or sections which are movable relatively to the cross-head, and that the three cam-rings $H^3$ $H^4$ $H^5$, hereinbefore referred to, and the actuating devices for said rings, hereinbefore described, constitute parts of the devices for so actuating the three sections of the pattern. Affixed to the center of and rising from the cross-head G is a vertical guide-rod $G'$, Figs. 4, 11, and 20. Secured to the top of said rod is a skeleton or spider frame $G^2$, having a central hub and radial arms and which forms a support for a part of the pattern which is immovably supported on the cross-head $G$. The outer ends of the arms of said spider-frame $G^2$ are arranged to engage vertical guide-recesses in three of the standards $I$, whereby said spider-frame is held rigidly from lateral movement. Surrounding the lower part of the rod $G'$ and resting on the top surface of the cross-head $G$ is a ring $G^3$, which is internally screw-threaded and within which fits a ring $G^4$, having exterior screw-threads engaging those of the ring $G^3$, said ring $G^4$ fitting around the rod $G'$. Surrounding the said rod $G'$ above the ring $G^4$ is a tube or sleeve $g'$, Figs. 4, 14, 15, and 20, which supports in its upper end a second spider-frame $G^7$, herein shown as cast integral with said sleeve $g'$. Said spider-frame is provided with radial arms to form movable supports for parts of patterns, the same being shown in side elevation in Fig. 14 and in plan view in Fig. 15. Resting on the top of the ring $G^3$ is a ring $G^5$ and within the same is a ring $G^6$, the exterior surface of which has screw-threaded engagement with the ring $G^5$. Said ring $G^6$ surrounds the lower part of the sleeve $g'$, which supports the spider $G^7$. Surrounding said sleeve $g'$ is a second sleeve $g^2$, which rests at its lower end upon the ring $G^6$. Said sleeve $g^2$ supports at its upper end a third spider-frame $G^8$, herein shown as cast integral with the said sleeve $g^2$. The spider-frame $G^8$ is provided with radial arms arranged to set between the arms of the spider-frame $G^7$ and which also form a movable support for parts of patterns. Said spider-frame is shown in elevation in Fig. 16 and in plan view in Fig. 17.

Outside of the spider-frames $G^7$ and $G^8$ is located a spider-frame $G^9$ of annular form, Figs. 4, 18, 19, and 20, which surrounds the outer ends of the arms of said spider-frames $G^7$ and $G^8$ and is provided with inwardly-extending radial arms arranged intermediate to the arms of the said spider-frames $G^7$ $G^8$, Fig. 18. Said spider-frame $G^9$ rests at its lower edge upon and is supported by vertically-arranged supporting-rods $G^{13}$, Figs. 4 and 20, which are adjustably connected at their lower ends with and supported by the plate $H$, the adjustable connection of the rods with said plate permitting the vertical adjustment of the upper ends of the said rods. In the particular construction shown the rods $G^{13}$ are screw-threaded at their lower ends and are provided with nuts above and below the plate $H$, whereby said rods may be adjusted vertically in the manner described. The annular spider-frame $G^9$ is provided with exterior V-shaped guide-lugs $G^{9a}$, which are arranged to engage and slide in vertical grooved guide-bars $G^{23}$, which are secured to the inner faces of three of the standards $I$ at the lower parts of said standards. Said bars $G^{23}$ form vertical guides by which the spider-frame $G^9$ is held in a position concentric with the central guide-rod $G'$ and is guided in its vertical movement. On the inner face of the annular part of the spider-ring $G^9$ are secured lugs $G^{9b}$, provided with vertical guide-grooves which are engaged by V-shaped guide projections on the ends of the radial arms of the spider-frames $G^7$ $G^8$ and whereby the said spider-frames $G^7$ $G^8$ are guided in their vertical movement. The several spider-frames $G^7$ $G^8$ $G^9$ are supported upon and given movement by the several cam-rings $H^3$ $H^4$ $H^5$. Provision is made for so sustaining the spider-frames upon the cam-rings, consisting of depending arms or lugs $G^{24}$, one on the under side of each radial arm of the several spider-frames, said arms carrying at their lower ends rollers $G^{10}$, $G^{11}$, and $G^{12}$, Figs. 4, 14, 48, and 49, which are arranged to engage and roll upon the cam projections $H^7$ on said cam-ring.

The several independently-movable parts of the pattern rest upon or are supported by the three spider-frames $G^7$, $G^8$, and $G^9$. In the construction herein illustrated the sections constituting the pattern are located at a considerable distance above the level of the spider-frames, and means for supporting the pattern-sections from said frames are employed, consisting of supporting-rods $G^{14}$ $G^{15}$ $G^{16}$, Figs. 4, 48, and 49, provided at their lower ends with clamps $G^{10}$, which engage the radial arms of the spider-frames, the upper ends of said rods being screw-threaded to engage the pattern-sections and having jam-nuts below the sections, by which the vertical position of the pattern-section may be accurately adjusted and the position of the patterns with respect to each other thereby accurately determined.

The sectional pattern illustrated in the drawings is adapted for making a car-wheel having spokes, and it embraces five parts— to wit, an external ring $G^{25}$, Figs. 4, 6, and 39 to 47, which forms the circumference of the wheel-pattern and gives shape to the tread and flange of the wheel-mold, a central hub $G^{20}$, which forms the center or hub of the pattern, and three intermediate relatively movable pattern-sections, consisting of an external cylindric pattern-ring $G^{17}$, located adjacent to the ring $G^{25}$, a part $G^{19}$, which forms the spoke portion of the pattern and which has inner and outer cylindric bearing-surfaces for contact with the central hub $G^{20}$ and with the inner surface of the cylindric pattern-ring $G^{17}$, and an annular part $G^{18}$, which is located beneath the spoke portion $G^{19}$ of the pattern and is provided with elevated parts between the arms of the part $G^{19}$, so that their surfaces form the surface of the pattern between the parts of the mold which form the spokes of the wheel. It will of course be understood that the upper parts only of the several pattern-sections come into play in making the mold, the same being so shaped as to form the cope or drag of the same, and that the lower parts of the pattern-sections are shaped so as to have proper sliding engagement with each other and to afford proper connection and support for the upper parts thereof. As clearly seen in Fig. 6, the external pattern-ring $G^{25}$ rests upon the plate J and moves with the said plate and the cross-head G, while the pattern-hub $G^{20}$, as seen in Fig. 4, is supported by a cylinder $G^{21}$, which rests upon the spider-frame $G^2$, which is supported from the cross-head G, so that said hub $G^{20}$ is also supported directly from said cross-head. The ring $G^{21}$ is externally screw-threaded and is provided with an adjustable locking ring or nut $G^{22}$. Said ring $G^{21}$ engages internal screw-threads in the hub-pattern $G^{20}$, so that it may be adjusted to the vertical height required according to the positions of the other parts of the pattern, the jam-ring $G^{22}$ being screwed against the bottom of the hub-pattern to hold it rigidly in place when adjusted.

Referring now more in detail to the construction of the movable parts or sections of the pattern, the exterior movable pattern-ring $G^{17}$ is shown in Figs. 38 and 38ᵃ, Fig. 38ᵃ illustrating also one of the supporting-rods $G^{14}$ and its clamp $g^{10}$ for securing said rod to the arm of its supporting spider-frame. The ring $G^{17}$ has cylindric outer and inner faces which fit against the inner face of the stationary pattern-ring $G^{25}$ and the outer face of the intermediate section $G^{19}$, the cylindric form of the contact-surfaces of the pattern-section enabling the same to have relative vertical movement. Figs. 40 and 41 show the spoke portion $G^{19}$ of the pattern, the same consisting of radial arms $g^3\ g^3$ and inner and outer cylindric parts $g^4\ g^5$. The inner annular part $g^4$ is of cylindric form and fits around the central hub $G^{20}$, while the outer annular part $g^5$ fits within the pattern-ring. Figs. 39 and 39ᵃ illustrate the part $G^{18}$ of the pattern which operates in connection with the spoke portion $G^{19}$, the same embracing the inner and outer annular parts $g^8\ g^9$, which are notched at their upper edges for the passage of the radial arms of the spoke-pattern sections $G^{19}$, the upper margins thereof between the notches being connected by flat horizontal portions $g^{10}$, which extend between the radial arms of the spoke portions of the pattern-sections and form the flat part of the mold between the same. The lower margins of the inner and outer parts $g^4\ g^5$ of the spoke portion $G^{19}$ extend around the outer annular part of the said pattern $G^{18}$ and within the inner annular part of the same, the radial arms $g^3$, which connect the cylindric parts $g^4\ g^5$ with each other, extending between and projecting above the flat elevated parts $g^9$ of the said section $G^{18}$.

K indicates the lower and $K^2$ the upper part of the flask, said lower part K having the form of a metal ring or chill, which is provided with trunnions K′, by which it may be lifted. Said lower part K of the flask rests upon the radially-corrugated outer margin of the ring J in contact with the outer surface of the external pattern-ring $G^{25}$, which is supported upon the inner or uncorrugated part of said ring J. The said part of the ring J on which the flasks rests is corrugated or provided with radial angular ribs in order that the flask may always rest directly thereon notwithstanding the presence of particles of sand which may be lodged on the top of said ring. The upper part $K^2$ of the flask is provided with radial vertical ribs $k$, which serve to rigidly connect the flask $K^2$ with the cylindric runner-box $K^3$, Figs. 44 and 45.

L indicates a sand-ring which is vertically movable and is adapted to rest on the upper edge of the flask $K^2$, so as to form an upward extension thereof and to confine the sand when the same is delivered to the flask. Said sand-ring is attached to a frame L′, Figs. 1, 2, 4, 23, and 24. Said frame L′, as shown in the drawings, is generally of rectangular form, consisting of longitudinal and transverse frame-bars $l\ l'$. To the ends of the bars $l$ are attached arms $l^2$, which extend outwardly to and have sliding engagement with vertical guide bars or ribs $L^2$, secured to the inner faces of the vertical columns B of the frame, said arms $l^2$ being shown as provided with notches adapted for engagement with the said guide-bars L′. Attached to the said columns beneath the arms $l^2$ of the sand-ring are vertically-arranged hollow cylinders or dash-pots $L^3$, which are conveniently secured to the columns by means of clamps $L^4$.

$L^2$ indicates piston-rods which enter the upper ends of the dash-pots $L^3$ and are provided with pistons $l^3$, Fig. 25. The piston-rods $L^2$ are secured at their upper ends to the arms $l^2$ of the sand-ring frame, said rods being shown as attached to the arms by having their upper ends inserted through apertures in said arms $l^2$ and provided with screw-threads and with nuts above and below said arms by which the rods are adjustably secured to said arms. Said dash-pots and the pistons therein serve to control the movement of the sand-ring and the frame when the sand-ring is lowered to bring it into contact with the flask, the descent of the ring being controlled by valves $L^7$ on the lower ends of the dash-pots.

Supported on the runner-box $K^3$ of the flask is an inner sand-ring $L^5$, Figs. 1 and 4, adapted to be placed on and removed from the runner-box by hand. Said sand-ring $L^5$ constitutes an upward extension of the runner-box.

Referring now to the construction of the upper part of the machine or those portions above the flask, these parts are made as follows: The horizontal top plate C of the machine-frame is provided on its under surface with a series of depending rods or studs O, to the lower ends of which is attached an annular presser-ring O′, the said presser-ring being rigidly connected with the top plate C by said studs O. The studs O preferably have screw-threaded engagement at their upper and lower ends with the top plate C and presser-ring O' and are provided with jam-nuts, this construction permitting the vertical adjustment of said presser-ring. Below said presser-ring O' is located a presser-plate $O^3$, which has a limited vertical movement with respect to said presser-ring. As a means of supporting the movable presser-plate $O^3$ the same is provided with a series of studs $O^2$, which rise from the same through guide-apertures in the presser-ring O' and are provided with heads at their upper ends to limit the descent of the movable presser-plate. The said presser-plate $O^3$ is centrally apertured and provided at its inner margin with a cylindric flange $o$, which rises through the central aperture in the stationary presser-ring. Said cylindric flange $o$ is of such height that when the movable presser-plate is at the lower limit of its movement and supported by the heads of the studs $O^2$, as seen in Fig. 5, the upper margin of the flange $o$ will rest within the opening in the presser-ring. Attached to the stationary presser-ring O' are a plurality of depending vent-pins $O^5$, which are adapted to pass through apertures formed for the same in the movable presser-plate $O^3$. The vent-pins $O^5$ may be attached in any suitable manner to the presser-ring O'; but as herein shown a special device is employed for detachably securing them to the presser-plates, consisting of tapered clamp-plugs $O^6$, which are provided with central apertures for the upper ends of the pins, are split longitudinally at their lower parts, and provided with screw-threaded upper ends which extend above the top of the ring O' and to which are applied nuts, by which the tapered plugs are drawn upwardly into the tapered sockets in the said ring O' and the split parts thereof thereby drawn into clamping engagement with the vent-pins.

$O^4$ indicates a cylindric ring which is arranged centrally within the upper part of the cylindric flange $o$ of the lower or movable presser-plate $O^3$ and which is provided at its upper margin with an outwardly-extending horizontal flange which engages the upper margin of the said cylindric flange $o$ and which is secured to the same by means of bolts passing through said horizontal flange into the upper edge of the said flange $o$, as indicated in Fig. 6. The cylindric flange $o$ is made of proper size to receive the upper end of the runner-box $K^3$ and the inner sand-ring $L^5$ when the flask is lifted for forming the mold, as clearly seen in Fig. 6. The ring $O^4$ is adapted to enter within the upper end of the said runner-box, as also seen in Fig. 6, and serves to compress the sand therein.

The top plate C is provided with a central opening or aperture which is surrounded by a cylindric wall or flange $c$, which rises from the horizontal part of said top plate and to the upper margin of which is secured a cap-plate P. In the center of said cap-plate is provided a bearing-aperture $p$, the central part of the plate on which said bearing-aperture is formed being provided with a downwardly-projecting part or hub. Located above and supported on the cap-plate P is a cylinder-head P', the same having the form of a horizontal plate or disk provided with depending arms $p'$ $p'$, by which said plate is supported above and parallel with the cap P. Said cylinder-head has a central aperture provided at its lower surface with a stuffing-box $P^3$. To the top of the cylinder-head P' is secured an upright cylinder $P^2$, constituting, with the said cylinder-head, a dash-pot. The said cylinder is shown as constructed of two parts or halves separated on a vertical plane and secured together by means of bolts passing through vertical flanges on the margins of the two parts thereof. The cylinder is shown as provided at its upper end with a head $p^{27}$, which is bolted to the cylinder in a familiar manner. Each half of the cylinder $P^2$ is provided at its side margin along the line of contact with the other half of the cylinder with a rabbet, the rabbets on the two half-cylinders being adapted when the two parts are secured together to form two interior vertical guide-grooves $P^4$ in the opposite sides of the cylinder, as clearly shown in Fig. 27. Within the cylinder $P^2$ is located a vertically-movable cross-head $P^5$, Figs. 5, 6, 28, and $28^a$, which cross-head is provided with laterally-extending and downwardly-bent arms $p^7$, arranged at opposite sides of the cross-head and adapted to engage and slide in the guide-grooves $P^4$ of the cylinder $P^2$. The cross-head $P^5$ is provided with a central aperture $p^{10}$. Attached to the under surface of the said cross-head $P^5$ is a cylindric piston-head $P^6$, which is secured thereto by bolts $P^9$, and is preferably provided with a central upwardly-extending hub which extends through the central aperture $p^{10}$ in the cross-head $P^5$. Between the piston-head $P^6$ and the cross-head $P^5$ is located a clamping-ring $P^8$, and between said clamping-ring and piston is secured a cup-shaped leather packing $P^7$, the cylindric marginal part of which extends around the piston-head and bears against the inner surface of the cylinder to make a tight joint between the said piston-head and the cylinder. Said cylindric part of the packing extends inside of the depending guide-arms $p^7$ of the cross-head and is in contact with the inner faces of said arms, which latter fill the spaces within the grooves $P^4$, and thereby prevent the passage of liquid along said grooves past or around the piston. Attached to the piston-head $P^6$ is a hollow stem $P^{10}$, which extends downwardly through the aperture in the lower cylinder-head P', said stem being shown as attached to the piston-head $P^6$ by means of a central screw-threaded hub on the said piston, with which the stem has screw-threaded engagement. Upon the stem $P^{10}$, below the cap P, is placed a sleeve $P^{11}$, and to the lower end of the piston-rod is attached a hollow sprue-pattern plunger consisting of an annular head $P^{12}$, a cylindric casing $P^{13}$, attached to said head, and a convex bottom cap $P^{14}$, which closes the lower end of the casing $P^{13}$. Said plunger constitutes the pattern for giving shape to the sand within the runner-box, so as to form a central recess into which the metal is poured in casting. The annular head $P^{12}$ is adjustably secured upon the stem $P^{10}$ by means of screw-threads upon the lower end of the stem engaged by interior screw-threads of the annular head, and the sleeve $P^{11}$ also has screw-threaded engagement with said stem at its lower end, while its upper end has close-fitting or sliding engagement with the exterior surface of the stem. The upper end of the sleeve $P^{11}$ is made tapered or conical and fits within a correspondingly-shaped annular countersunk seat surrounding the opening in the cap-plate P. Said sleeve $P^{11}$ serves the purpose of a jam-nut, the same operating in connection with the annular head $P^{12}$ to hold the latter from movement on the stem when adjusted to a desired position thereon. In the bottom cap $P^{14}$ of the casing $P^{13}$ are formed a plurality of (preferably three) apertures $p^8 p^8 p^8$, which are located adjacent to the casing $P^{13}$ and are arranged at equal angular distances apart. Within said casing $P^{13}$ and free to move vertically therein is a disk $P^{15}$, provided with marginal notches $p^9 p^9 p^9$, corresponding with the position of the apertures in the cap $P^{14}$, Figs. 30 and 30$^a$. Connected with the margin of the disk and extending through the apertures in the cap $P^{14}$ are a plurality of vertical bars $P^{16}$, the lower ends of which extend through the wall $P^{14}$ and constitute the sprue-patterns. The upper parts of said bars are of rectangular form and fit closely within the apertures $p^8$ in said cap $P^{14}$. The upper ends of the said bars fit within the notches $p^9$ in the disks $P^{15}$, and said bars are held from vertical movement with respect to the disk by means of transverse flanges $p^3$, which extend across the inner parts of the notches and are adapted for engagement with transverse notches $p^4$ in the upper ends of the bars $P^{16}$, as clearly seen in Figs. 30, 30$^a$, and 31. The margin of the disk $P^{15}$ fits closely within the casing $P^{13}$, and the bars $P^{16}$ are arranged to bear against the inner surface of said casing, so that the casing serves to confine the upper ends of the bars within the notches and in engagement with the flanges $p^3$ therein.

Attached to the disk $P^{15}$ and extending upwardly therefrom is an upright rod $P^{17}$, Figs. 5 and 6, which extends upwardly through the hollow stem $P^{10}$ and passes at its upper end through the piston-head $P^6$ to a point above the same. On the upper end of the said rod $P^{10}$ is a disk $P^{18}$, which is made adjustable vertically on the rod, preferably by means of screw-threads on the upper end of the rod engaging a central screw-threaded aperture in the disk and a jam-nut applied to the rod above the disk. The piston-head $P^6$ and hollow stem $P^{10}$, together with parts carried by the latter, are adapted for free vertical movement in the cylinder $P^2$, except so far as the downward movement of these parts may be controlled by presence within the lower end of the cylinder below the piston-head of air, which escapes therefrom as the piston descends. The exit of the air from the said cylinder is controlled by means of a valved outlet $P^{29}$. Said cylinder $P^2$ thus constitutes a dash-pot by which the descent of the several movable parts referred to under the action of gravity is controlled.

The disk $P^{15}$, with its connected sprue-patterns, has a limited vertical movement within the casing $P^{13}$ of the hollow plunger, so that when the plunger is elevated and the rod $P^{17}$ and disk $P^{15}$ are drawn upwardly both the rod and the plunger may be held in their elevated positions by engagement of the disk $P^{18}$ with a holding device, the disk $P^{15}$ and the sprue-patterns being drawn upwardly within the hollow plunger when the parts are so held or sustained in their elevated positions. The disk $P^{18}$ on the upper end of the rod $P^{17}$ constitutes part of the holding devices for the purpose stated, which latter are located mainly at the upper end of the cylinder $P^2$ and partially within the same, Fig. 2. Now referring to the construction of these parts, $P^{19}$ is a detent-lever located in the upper part of the cylinder and having a depending arm provided with a hook which is located in position for engagement with the disk $P^{18}$. Said detent-lever is, as herein shown, mounted upon a pivot $p^5$, which is supported by means of the bracket $p^6$, attached to the inner face of the said cylinder $P^2$. The detent-lever $P^{19}$ has a horizontal arm which extends outwardly through the wall of the cylinder and on which is located a counterweight $P^{20}$. The bracket $p^6$ is shown as attached to a plate $P^{22}$, which is inserted between the flanges of the cylinder $P^2$ beneath the horizontal arm of the detent-lever $P^{19}$. The downward movement of the horizontal arm, as well as the inward movement of the hooked end of the detent-lever $P^{19}$, is limited by a set-screw $P^{21}$, inserted through said horizontal arm and adapted to bear at its lower end against the top of the plate $P^{22}$. The hooked end of the detent-lever is adapted to be moved backwardly through contact of the disk $P^{18}$ with the lower end of the same, the hook of the detent-lever being adapted to engage the under surface of the disk, so as to hold the same disk and the rod $P^{17}$ from downward movement when the parts are engaged.

A tripping device is provided for moving the detent-lever $P^{19}$ so as to release it from the disk $P^{18}$, which is made as follows: $P^{23}$ is a vertical connecting-rod the upper end of which is pivoted to the horizontal arm of the detent-lever. The lower part of said rod $P^{22}$ passes through and is guided in the cylinder-head P' and extends to a point below the same. Attached to the lower end of the rod P$^{23}$ is a shoe P$^{24}$, having an inclined or oblique lower surface. Said shoe engages and rests upon a wedge-block P$^{25}$, Figs. 5, 6, 10, and 26, which rests and is adapted to slide horizontally upon the cap-plate P. Attached to the wedge-block P$^{25}$ is an actuating-rod P$^{26}$, which is arranged horizontally and extends outward to the front margin of the top plate C. On the said top plate C and adjacent to the end of the connecting-rod P$^{26}$ is a lever Q$^{10}$, which is pivoted between its ends to a bracket Q$^{11}$ on said plate C. The arm of said lever Q$^{10}$, which rises from its pivot, is connected with the outer end of the rod P$^{26}$. The lower arm of said lever Q$^{10}$ extends below the pivot Q$^{11}$ and is adapted for engagement with a lever-arm Q$^9$, attached to a rock-shaft Q$^6$, which extends horizontally across the machine-frame adjacent to the front edge of the top plate C, Figs. 8 and 10. Said rock-shaft is shown as mounted in bearings Q$^8$, attached to the front edge of the said top plate. For operating said rock-shaft a crank-arm Q$^7$ is affixed to one end of the same, Fig. 8, and extends horizontally therefrom. To the free end of the arm Q$^7$ is attached an upright operating-rod Q$^5$, Figs. 1, 2, 7, and 8, the lower end of which is pivotally connected to a lever Q$^3$, Figs. 1, 2, and 7, pivoted on a pivot-pin Q$^4$, which is secured to a bracket A$^2$, fixed to the base-plate A of the machine, as shown in Figs. 1 and 7. The lever Q$^3$ extends at one side of the hand-lever A$^4$ and is provided with a curved part located in position to be engaged and moved or actuated by a pin Q$^2$ upon a latch-rod arranged to slide endwise on the said operating-lever A$^4$ and connected with a latch-lever Q on said operating-lever. The hand-lever A$^4$ is designed, primarily, to operate the sand-feeding devices and is provided with a latch-lug Q', adapted to engage a notched segment A$^3$, by which the lever is held from movement except when the latch-lever Q is operated, said latch-lever being connected with the lug Q' and pin Q$^2$ by the latch-rod. The plunger and sand-ring tripping devices are therefore operated before the lever A$^4$ can be moved to operate the sand-delivering device.

The trip-lever described and the means for actuating the same constitute a means for releasing the sprue-pattern plunger and permitting the descent of the same, together with the sprue-patterns carried thereby, in the operation of making that part of the mold within the runner-box of the flask K$^2$ and which includes the sprues and the recess into which the metal is poured.

As hereinbefore stated, the sand-ring L is made vertically movable, so that it may be lifted from the flask K$^2$ and lowered thereon when desired for use, the sand-ring being lifted away from the flask at the time of placing the same upon the machine and removing it therefrom. In connection with the vertically-movable sand-ring we have provided means for supporting the said sand-ring above the flask and out of the way of the other parts and also for tripping and releasing said ring, so as to permit it to fall to its place on the flask when the latter is ready to receive the sand. The devices for suspending and tripping the said sand-ring, as herein shown, are made as follows: As hereinbefore stated, a rock-shaft Q$^6$ is arranged horizontally at the front of the top plate C of the machine, which is operated or given oscillatory movement from the hand-lever A$^4$ in the manner described. Said rock-shaft is provided with rigidly-attached crank-arms Q$^{12}$ Q$^{12}$, as seen in Figs. 1, 2, 8, and 10. Pivotally attached to each of these crank-arms is a connecting-rod Q$^{13}$, which is arranged horizontally beneath the top plate C. One of said rods Q$^{13}$ extends across the machine to the opposite side thereof, as seen in Fig. 10. The other rod Q$^{13}$ terminates a short distance inwardly from the edge of the top plate at which the rock-shaft is located, as seen in Fig. 26. Said rods are adapted to slide at their ends in bearings Q$^{15}$, attached to the lower surface of said top plate C, as clearly seen in Figs. 10 and 26. Secured to said rods Q$^{13}$, adjacent to the bearings Q$^{15}$, are wedge-blocks Q$^{14}$. Each of said blocks is provided with an inclined lower surface adapted to engage a correspondingly-inclined surface on the horizontal arm of a bell-crank lever Q$^{16}$, the vertical arm of which latter extends downwardly from the pivot $q$ thereof, Fig. 10. The hooked end of said bell-crank lever Q$^{16}$ is directed inwardly and forms a detent adapted for engagement with the sand-ring frame L' when the same and the sand-ring are in their elevated position or in the position shown in dotted lines in Fig. 1. A spring $q'$, applied to the depending or detent arm of the bell-crank lever Q$^{16}$, serves to throw said depending arm inwardly or into position to engage the sand-ring frame. The two bell-crank levers operated by the long and short rods Q$^{13}$ are adapted to engage the sand-ring frame at diagonally opposite points, the bell-crank lever associated with the longer rod being located at one corner of the top plate C and that associated with the shorter lever at the diagonally opposite corner of said top plate. When the said detent-arms are thrown outwardly or tripped through the operation of the several parts actuated from the hand-lever A$^4$, the sand-ring will be released and permitted to fall, the dash-pots L$^3$, as hereinbefore described, serving to control the downward movement of the sand-ring, so as to prevent it striking violently upon the top of the flask.

The operation of the parts described in the making of the upper or cope portion of a sand mold is as follows: When the parts of the machine are in position to receive the flask, the operating-levers A$^4$ and A$^5$ are in the positions shown in Fig. 1, the cross-head and ram rest on the cushion-springs on the base of the frame, the sand-ring is elevated and hangs from the supporting-hook at each end thereof, as shown in dotted lines in Fig. 1, and the plunger is in its elevated position, supported by the engagement of the detent $P^{19}$ with the disk $P^{18}$, as shown in Fig. 6. In preparing to make the mold the flask is deposited on the corrugated surface of the flask and pattern supporting ring J, and the inner or smaller sand-ring $L^5$ is then placed on the runner-box by the operator. The next step is to release the sand-ring and the plunger, this being accomplished as follows: The operator grasps the lever $A^4$ and its latch Q, and by drawing inwardly the said latch the pin $Q^2$, connected therewith, lifts the free end of the lever $Q^3$, and thereby draws down its connecting-rod $Q^5$, with the effect of turning the rock-shaft $Q^6$. Said movement of said rock-shaft actuates the cranks $Q^{12}$ and their connecting-rods, drawing the wedge-blocks $Q^{14}$ forward on the inclines on the short arms of the hooks $Q^{16}$, thereby tripping them and releasing the sand-ring. The fall of said sand-ring is cushioned by the dash-pots $L^3$, but said ring continues to descend until it rests upon the top of said flask $K^2$. The turning of the rock-shaft also operates through the crank $Q^9$, fixed thereon, the lever $Q^{10}$ and its connecting-rods $P^{26}$, Fig. 10, with the result that the wedge $P^{25}$ is forced beneath the wedge $P^{24}$, lifting the rod $P^{23}$ and tripping the detent $P^{19}$, so as to release it from the disk $P^{18}$. This releases the rod $P^{17}$ and the sprue-pattern plunger, the descent of the latter being regulated by the downward passage of the piston-head $P^6$ in the cylinder $P^2$, which acts as a dash-pot to control the descent of the plunger and parts connected therewith. As the plunger gradually descends the sprue-patterns finally come to rest on the hub of the pattern, the plunger itself being suspended by the cross-head, which rests on the top surface of the cylinder-head P'.

With the flask, sand-ring, and plunger in position, as described, the machine is ready for the introduction of the sand into the flask, the same being supplied, preferably, by means of the sand-feeding device illustrated in the drawings and hereinafter described.

The sand-ring and plunger are released by actuation of the latch Q on the lever $A^4$ only and without any movement of the lever itself, and when said lever is moved to operate the devices hereinafter described for supplying sand to the flask the lug Q' on the latch rides along on the notched segment $A^3$ and holds the pin $Q^2$ raised and holds in its elevated position the outer end of the lever $Q^3$, by which the sand-ring and plunger are tripped. The sand being thus supplied to the flask, the mold is ready for compression, which is accomplished as follows: The operator moves the lever $A^5$ in a direction to carry its upper end away from the machine to the position shown in Fig. 1. This movement is communicated by the short arm of said lever to the connecting-rod $D^3$, which opens the three-way valve $D^2$ and admits the pressure fluid to the cylinder D, whereby the ram F and all parts of the machine resting thereon are raised or begin their upward movement. During the upward movement of the ram all those parts of the machine which support the flask, the patterns, and their operating mechanism are carried upwardly with the same. The first compression of the sand takes place when the upward movement of the ram brings the top surface of the sand in the flask into contact with the movable pressure-plate, the compacting of the sand at this time, however, being limited by the weight of the said pressure-plate, which acts to hold the sand against the pressure of the movable parts of the patterns as they are forced upward into the sand before the movable pressure-plate is brought against the pressure-ring. The continued upward movement of the ram has the effect of lifting the pressure-plate until it reaches the upward limit of its movement and comes into bearing against the pressure-ring. As the pressure-plate rises the vent-pins enter the mold and the plunger is carried up until the sleeve on its stem comes to rest at its upper end against the seat in the cap-plate P. As the sand is compressed the sand-ring L' rises above the level of the sand, the inner sand-ring $L^5$ is raised into the cylindric flange o above the top of the sand in the runner-box, while the sprue-patterns are carried upwardly in the hollow plunger, said sprue-patterns sliding upwardly in the said plunger after the same has reached the upward limit of its movement. By such upward movement of the sprue-patterns the center rod $P^{17}$ is lifted until the disk thereon passes and is engaged by the detent $P^{19}$, as shown in Fig. 6.

While the sand in the flask is being compressed or compacted by the direct downward pressure of the pressure-ring, pressure-plate, and plunger the sand in the lower part of the flask is being compressed separately in its several parts by the action of the pattern-sections, which latter are separately moved upward by the actuating mechanism therefor as follows: Referring to the sectional view Fig. 4, it will be seen that the hub of the pattern $G^{20}$ rests on the stationary spider-frame $G^2$, which is directly supported from the cross-head by the center rod G', so that said central part or hub of the pattern rises by the direct pressure of the ram. As said central part or hub rises it forces up the sprue-patterns and compacts the sand under and around the bottom of the plunger and in the runner-box, as clearly seen in Fig. 6. As before stated, the part $G^{19}$ of the pattern, which forms the spokes of the wheel, is supported on the spider-frame $G^7$, the pattern-section $G^{18}$, which extends beneath and between the spokes or bars of the pattern $G^{19}$, is supported on the spider-frame $G^8$, and the annular pattern-section $G^{17}$, which surrounds the sections $G^{19}$ and $G^{18}$, is supported by the spider-frame $G^9$, and the three spider-frames $G^7$, $G^8$, and $G^9$ are sustained from the ram or cross-head by means affording separate vertical movement of the said spider-frames with respect to the cross-head. The pattern-ring $G^{25}$, which forms the flange portion of the wheel, rests on the flask and pattern supporting ring J, so that said ring $G^{25}$, like the hub $G^{20}$, is sustained directly and rigidly from the cross-head. The said parts of the pattern which are supported by the spider-frames $G^7$, $G^8$, and $G^9$ are carried upward with the other parts of the pattern and the flask by the direct movement of the cross-head until the sand in the flask comes into contact with the movable pressure-plate and is partially compacted by its weight. At this time the sliding blocks $M^7$ are raised on their guide-rods $N'$ by the upward movement of the cross-head until they are stopped by the adjustable stops on the said guide-rods. The position of these controls and regulates the movements of the patterns $G^{17}$, $G^{18}$, and $G^{19}$ with respect to each other, said stops being arranged as necessary for lifting the patterns in the order desired. When, for instance, the machine is arranged for molding car-wheels, as shown in the accompanying drawings, devices are arranged for moving the several parts of the patterns in the following order: First, the pattern-section $G^{18}$ rises beneath and between the spokes of the pattern-section $G^{19}$ to the requisite height in relation to that pattern. The pattern-section $G^{19}$ then rises until it reaches its proper position with respect to the section $G^{18}$. Next the pattern $G^{17}$ is raised to its maximum height with relation to the pattern-sections $G^{18}$ and $G^{19}$, and then all three sections are raised together to their maximum height, or, in other words, are brought to their final position with respect to the pattern-sections $G^{20}$ and $G^{25}$. These several movements of the pattern-sections $G^{17}$, $G^{18}$, and $G^{19}$ are produced as follows: During the continued upward movement of the ram and the cross-head after the sand in the flask has come into contact with the pressure-plate by which the said plate is carried up to the fixed pressure-ring the sliding block $M^7$, connected with the crank $M^5$ by the sliding block $M^6$, Fig. 11, rises until its upward movement is arrested by the stop on the guide-rod $N'$. The upward movement of the bearing M, in which the segmental gear $M^{3\,1}$ is supported on the cross-head, turns the said segmental gear, and thereby moves the cam-ring $H^5$, Figs. 4 and $12^a$, so as to bring the inclined faces of the cam-blocks $H^7$, attached to said ring, into contact with the rollers on the spider-frame $G^8$, with the result of lifting said spider-frame until the rollers thereon rest on the horizontal top surfaces of the said blocks, Figs. 48 and 49. While this movement is taking place the upward movement of the sliding block $M^7$, connected by the sliding block $M^6$ with the crank-arm $M^4$, Figs. 1, 9, and 11, is stopped by the stop-nut on the guide-rod $N'$ and the segmental gear $M^{3\,3}$ is revolved, together with the cam-ring $H^4$, so that its cam-blocks $H^7$ engage the rollers on the spider-frame $G^7$ until they are lifted and rest on the horizontal top surface of said cam-blocks. The sliding block $M^7$, sliding block $M^6$, the crank $M^{4\,4}$, and segmental gear $M^{3\,2}$ operate to turn the cam-ring $H^3$ and lift the spider-frame $G^9$ in the same manner. As the spider-frames and patterns are thus raised they are all brought into position to receive the final pressure with other parts of the pattern through the action of the ram opposed by the fixed pressure-ring on the top plate of the machine. When the maximum pressure is reached, the flask, sand-rings, patterns, movable pressure-plates, plunger, sprue-patterns, vent-pins, and molds are in the position shown in Fig. 6 and the cranks and sliding blocks are in the position shown in dotted lines in Fig. 9 and in full lines in Fig. 49. The parts are now ready for the release of the pressure fluid and the downward movement of the flask. During the descent of the flask the patterns are stripped from the sand within the same, as follows: The operator moves the lever $A^5$ so as to carry its upper end toward the machine or to the position opposite to that shown in Fig. 1, thereby opening the valve $D^2$ and releasing the pressure fluid through the exhaust-pipe $D^4$. The ram and the parts of the machine supported thereby then descend. In the descent of the parts the detent-arms of the levers $Q^{16}$ engage the sand-ring L and hold it from descending, as shown in dotted lines in Fig. 1. The sprue-pattern plunger descends for a short distance with the mold, its bottom cap $P^{14}$ stripping the sprue-patterns, which remain stationary, being supported by the disk $P^{15}$, the rod $P^{17}$, and the disk $P^{18}$, which is at this time engaged by the detent $P^{19}$, Fig. 6. The descent of the plunger and the stripping of the sprue-patterns therein are stopped when the head $P^{12}$ of the plunger-stem comes to rest upon the disk $P^{15}$, suspended, as before explained, by the detent $P^{19}$. When the descent of the plunger is arrested, the plunger itself is stripped from the mold by the cylindric ring $O^4$ on the movable pressure-plate, which latter moves downwardly with the flask from the beginning of the descent of the latter and continues to descend therewith, thereby stripping the vent-pins, which are secured in the pressure-ring. When the heads of the suspension-rods $O^2$ come to rest on the pressure-ring, the downward movement of the pressure-plate will be arrested and the same will be suspended on the pressure-ring. After the flask has descended below the pressure-plate the molds will be clear of all the upper parts of the machine and the operator may lift the inner sand-ring from the runner-box.

Referring now to the operation of the parts in the stripping of the pattern-sections from the under surface of the sand within the molds, Fig. 9 shows in dotted lines the positions of the several parts of the machine which operate the patterns $G^{17}$, $G^{18}$, and $G^{19}$ when the sand within the molds is subjected to the full pressure of the ram. At this time the sliding blocks $M^7$ rest against the stop-nuts on the vertical guide-rods $N'$. As the cross-head descends the blocks $M^7$ are engaged and arrested by the detents $N^3$, which are attached to the adjustable blocks $N$ on the vertical rods $N'^a$, said blocks being disposed in such vertical position with respect to each other as to permit the movement of the pattern-sections downwardly in the order and at intervals of time as may be found desirable by reason of their shape and number. In the arrangement of the parts for operating the wheel-pattern made up of sections or segments, as illustrated, the order will desirably be as follows: The sliding block $M^4$ is first stopped by its detent, thereby revolving the segmental gear $M^{33}$ and the cam-ring $H^4$, thereby lowering the spider-frame $G^7$ and stripping the pattern $G^{19}$, which forms the surface of the mold between the spokes, through the pattern $G^{18}$. The sliding block connected with the crank $M^{44}$ is next stopped, the movement of the said crank through the gear $M^{32}$ and cam-ring $G^3$ allowing the spider-frame $G^9$ to fall, thus stripping the exterior annular pattern $G^{17}$ through the pattern $G^{25}$. The sliding block engaging the crank $M^5$ will then be stopped, thereby lowering the spider-frame $G^8$ and permitting the pattern $G^{18}$ to descend, the tripping action through the operation of the movable pattern-sections being completed when the spider-frames $G^7$ $G^8$ rest on the adjustable rings $G^4$ and $G^6$ and the ring $G^9$ rests on the adjustable bolt $G^{13}$, Figs. 4 and 20. As the descent of the cross-head continues and the several crank-arms resume the inclined position shown by full lines in Figs. 9 and 48, the projections $M^{61}$ on the pivoted blocks $M^6$ engage the lips on the sides of the detents $N^3$, (shown by dotted lines $n^3$, Figs. 9, 48, and 49,) tripping said detents and releasing the blocks $M^7$. Said blocks $M^7$ will then descend with the crank-arms and their bearings until the cross-head $G$ comes to rest on the cushion-springs on the bed-plate $A$ or reaches the position shown in Fig. 1.

An important feature of our invention is embraced in the construction by which the pattern consists of several parts or sections which are separately movable with respect to each other, and devices are provided which as the cross-head of the machine rises and the pattern moves bodily upward act to separately and positively force upward the several pattern-sections and when all are fully advanced to hold all of the pattern-sections rigidly in their forward positions while the final pressure is being made. In our machine, therefore, while some of the pattern-sections are advanced into the sand mold as the pattern rises in the mold at no time is the pressure of the section or sections so advanced relaxed; but the advanced sections are rigidly held in their advanced position and the other sections thereafter come into proper relation thereto. As a result there will be no intervals of time between the time of greatest advance of any one section and the time of greatest pressure of the entire pattern when there is any relaxation of the pressure on the sand, so that there is no liability of the sand over one section being displaced by the pressure of adjacent sections at any time during the advance of the separate sections or final pressure of the entire pattern.

The machine shown in the accompanying drawings is provided with mechanism for supplying sand to the flask, which embraces a receptacle divided into an upper or receiving and a lower or measuring compartment by a door or valve and having a discharge door or valve and a movable delivery-spout, together with operative connections between said valves and spout and certain parts of the molding-machine proper, whereby the sand measuring and discharging devices are actuated at proper times in the operation of the machine. The operative connections between said sand-delivery device and the parts of the molding-machine are herein claimed as part of the present invention, while the features of said sand-feeding device not directly related to the operation of the molding-machine are claimed in a separate application for patent, Serial No. 107,739, filed by us in the United States Patent Office on May 17, 1902. To briefly describe the features of construction in said sand-supplying mechanism, as shown in the drawings, Figs. 1, 2, 5, 8, 26, and 32, the same is made as follows: Said sand-supplying mechanism embraces generally a vertically-elongated receptacle attached to and extending above the top plate of the machine at one side thereof and divided by a horizontally-sliding door into a lower compartment or measuring-chamber and an upper or receiving compartment, the lower compartment being provided with a valved discharge-opening, in connection with which is arranged a laterally movable or shiftable discharge-spout $R^{32}$, by which the sand is directed to a point over the flask, and which may be shifted away from the flask and out of the way of the same during the pressing operation. The lower compartment or measuring-chamber is adjustable in size, so that a measured quantity or charge of sand may be delivered to the flask, according to the size of the same. The lower compartment or measuring-chamber consists of a hopper-shaped section $R$, secured to the top plate $C$ of the machine, an intermediate section $R'$, and an upper section $R^3$. To the lower edge of said upper section $R^3$ is attached a telescopic section $R^2$, which is adapted to slide vertically in the section $R'$. Provision is made for vertically adjusting the upper section $R^3$, consisting of screws $R^6$, provided with adjusting-nuts $r^6$, which engage bracket-bearings $r^7$, bolted to the section $R'$. The adjustment described provides for changing the capacity of the lower receptacle, according to the quantity of sand required for each particular mold to be made. Above the section $R^3$ is another section $R^4$, to the top of which is attached a hopper-shaped extension $R^5$, which forms, with the section $R^4$, the upper compartment of the receptacle, to which the sand is delivered by a conveyer or the like. Said sections $R^3$ and $R^4$ are provided with meeting flanges $R^7$, which are of rectangular form, as seen in plan view, Figs. 26 and 32, and which provide an open slot or space for the passage of a horizontal sliding door $R^{11}$. A guide-frame $R^8$ extends outwardly from the horizontal meeting flanges $R^7$ to support said door when moved outwardly from the receptacle. $R^{14}$ $R^{14}$ are rack-bars, which are attached to the door and which slide in bearing-boxes $R^9$, said rack-bars being located at opposite sides of the reservoir, as clearly seen in Fig. 32. Said rack-bars $R^{14}$ are connected with the door $R^{11}$ by means of a cross-rod $R^{10}$. A horizontal shaft $r$ is mounted in brackets $R^{12}$ and is provided at its ends with gear-wheels $R^{13}$, which intermesh with the rack-bars $R^{14}$. The shaft $r$ is provided with a sprocket-wheel $R^{15}$, over which is trained a sprocket-chain $r'$, to the ends of which are attached two vertical rods $R^{16}$. At their lower ends the rods $R^{16}$ are attached to a chain $r^2$, which passes over a guide-pulley $R^{17}$, arranged at the base of the machine. Attached to the lower part of the rod $R^{16}$ and the sprocket-chain $r^2$ are two clamps $R^{18}$, Fig. 4, between which and encircling the sprocket-chain and rod is the end of a bracket-arm $R^{19}$, which is attached to the cross-head G of the machine, Figs. 2, 7, and 11, said bracket-arm being adapted to be brought in contact with the clamps $R^{18}$ in the vertical movement of the said cross-head. The sand-door $R^{11}$ is opened and closed automatically by the movement of the cross-head G, so as to permit the sand to descend from the upper to the lower compartment of the sand-receptacle. Attached to the lower flange of the section R, Figs. 1, 5, 8, and 26, are two parallel horizontal guide-bars $R^{20}$, arranged to form guides for a door-frame and also supports or guides for the sand-spout $R^{32}$, said sand-spout being attached to a spout-frame consisting of side bars $R^{21}$ and cross-bars $R^{24}$. Said spout and spout-frame are suspended on the guide-bar $R^{20}$ by means of wheels $R^{22}$, supported by brackets $r^6$, which are bolted at their lower ends to the side bars $R^{21}$ of the said spout-frame. Horizontal rack-bars $R^{24}$ are secured to the spout-frame by means of brackets $R^{23}$, which are bolted to the said rack-bars and to the side bars $R^{24}$ of the spout-frame. Bolted to the guide-bars $R^{20}$ and also to the section R are two bracket-bearings $R^{25}$, carrying a shaft $r^3$, provided with gear-pinions $R^{26}$, said pinions being arranged to engage and operate the rack-bars $R^{24}$. To one end of the shaft $r^3$ a sprocket-wheel $R^{27}$ is affixed, over which is trained a sprocket-chain $r^4$, to the ends of which are attached rods $R^{28}$.

Mounted on the bearing $A^6$, attached to the base-plate A, is another sprocket-wheel $B^9$, Figs. 1, 2, 7, and 11, around which is trained a chain $r^5$, attached to the rods $R^{28}$. On the chain $r^5$ is a clamp $R^{30}$, and pivotally attached to said clamp is a connecting-rod $R^{21}$, the lower end of which is connected to the short arm of the main operating-lever $A^4$. (Shown in Figs. 1, 2, and 7.) To the top of the sand-spout $R^{32}$ a square flange $R^{33}$ is secured. Said flange is bolted to the side bars $R^{21}$, which, with the cross-bars $R^{34}$, bolted to the same, form the spout-frame, the said side bars $R^{21}$ being arranged below and in contact with the guide-bars $R^{20}$, as seen in Fig. 8. Resting on the bars $R^{34}$ and affixed thereto is a door $R^{35}$, arranged to slide at its edges on the guide-bars $R^{20}$. One end of the door $R^{35}$ extends beyond the cross-bar $R^{34}$ of the spout-frame about half-way across the mouth of the section R when the spout is retracted or in the position shown in Fig. 5. Directly over the sand-spout is an aperture $R^{38}$ in this door, as shown in Figs. 5 and 26, corresponding in position with the opening in said spout. Above the door $R^{35}$ and arranged to slide on the guide-bars $R^{20}$ is a second door $R^{36}$. (Shown in Figs. 5, 8, and 36.) This door is made long enough to extend from the edge of the door $R^{35}$ across the mouth of the section R when the spout and door $R^{35}$ are retracted, as shown in Fig. 5. At the opposite ends of the door $R^{36}$ depending stops $R^{37}$ $R^{37a}$ are fixed, as shown in Fig. 5. In said door $R^{36}$ is formed an aperture $R^{29}$ as wide as and longer than the aperture $R^{38}$ in the lower door. Said upper door is actuated solely by the movement of the lower door and spout. The movement of the spout from the position shown in Figs. 5 and 26 toward the machine serves to bring the end of the lower door $R^{35}$ against the stop $R^{37}$ on the upper door, so as to carry said door forward and open the mouth of the hopper gradually to its full extent as the spout is moved beneath said hopper. By this operation the sand is released and falls into the spout. As the spout is moved back away from the machine the outer end of the lower door strikes the stop $R^{37a}$ on the upper door, thereby forcing said upper door back with the lower door and bringing the doors to the position shown in Fig. 5, when the discharge-opening is closed.

With the sand-delivery devices arranged and connected as described the operation of the machine will be as follows: At the beginning of the operation of making a mold the operator grasps the hand-lever $A^4$ and its latch-lever Q, and the effect of moving the latch-lever is to release the sprue-pattern plunger and sand-ring, as above described. The actuation of the latch-lever Q releases the lever-latch and the hand-lever is then drawn outward. By this movement of the hand-lever its shorter arm raises the connecting-rod $R^{31}$, and thereby moves the rods $R^{28}$ so as to turn the sprocket-wheel $R^{27}$ and its shaft $r^3$, so as to move the doors constituting the discharge-valve of the sand-receptacle, and thereby permitting the charge of sand contained within the lower or measuring compartment of the receptacle to flow to the upper end of the delivery-spout, while at the same time shifting said spout inwardly until its lower end is over the pattern and flask. During the movement of the sand-spout the end of the lower door $R^{35}$ strikes the stop $R^{37}$ on the upper door $R^{36}$, and as the spout and doors move the sand is gradually released, the sand being distributed evenly in the flask through the movement of the discharge end of the spout over the same.
By the reverse movement of the lever $A^4$ when the sand has been discharged from the receptacle the discharge-valve thereof is closed and the hopper run back to its original position and out of the way of the flask and pattern when the latter rise toward the pressure-plate. After the delivery of the sand to the flask the hand-lever $A^5$ is then operated to admit the pressure fluid beneath the ram, as above stated. As the ram and cross-head rise, the arm $R^{19}$ on said cross-head strikes the upper clamp $R^{18}$, so as to actuate the rods $R^{16}$, and thereby turn the shaft $r$, by which the upper door $R^{11}$ of the receptacle is opened. The sand contained in the upper compartment of the sand-receptacle is thus allowed to fall into and fill the lower or measuring compartment. In the subsequent descent of the ram and the cross-head the arm $R^{19}$ gives a reverse movement to the rods $R^{16}$ and the shaft $r$, thereby closing the door $R^{11}$ and cutting off from the sand in the receptacle the portion thereof in the lower compartment from such sand as may be above the door. The parts are then in position for the next operation of the machine, as above described.

We will now describe the construction of a crane which is shown in Figs. 1, 2, 33, 34, 35, and 36 of the drawings and which is provided to deposit the flask on the machine and remove the finished mold therefrom. Said crane is not herein claimed as part of the present invention, but forms the subject of a separate application, Serial No. 107,738, filed in the United States Patent Office May 17, 1902. On a rectangular base-plate S S, arranged to be bolted to suitable foundations, a standard S is fixed. Bolted to this base-plate are twin vertical cylinders S', Figs. 33 and 34, the pistons $S^2$ of which are joined by a cross-head $S^3$, arranged to slide vertically on the standard S. Clamped on the standard S is an adjustable collar $S^4$, (shown in Figs. 2 and 3,) arranged and adapted to form a vertical and horizontal stop. On the upper end of said standard and fixed thereto is a head-block $S^5$, to which are attached brace-rods $S^6$, which extend to and are attached to the top plate C of the molding-machine, as shown in Figs. 2 and 3. The cylinders S' are provided with a pressure and exhaust pipe $S^7$ and a three-way cock $S^8$. (Shown in Fig. 35.) Pivoted to a crank-arm on said cock is a connecting-rod $S^9$, pivotally attached at its upper end to the short arm of an operating-lever $S^{10}$, the said lever being pivotally supported on a bearing $S^{11}$ on the cylinder S', Figs. 2 and 35. Supported on the cross-head $S^3$, with the standard S as its central bearing, is a revolving crane-head $S^{12}$. (Shown in Figs. 35 and 36.) On bracket extensions of this revolving head are bearings in which are mounted supporting-shafts $S^{13}$, each of which is provided with grooved wheels $S^{14}$. Supported and held in a horizontal position by these wheels is a traveling frame $S^{15}$, to which the crane-arms $S^{16}$ are attached. The ends of these arms are provided with hooks $S^{23}$ for engaging and carrying the flasks and molds. Fixed on the under side of the parallel side members of the traveling frame are rack-bars $S^{17}$. Beneath said frame and rack-bars and mounted in the bearings $S^{20}$, which are bolted to the revolving head, is a shaft $S^{18}$, on which are pinions $S^{19}$, arranged to engage the racks $S^{17}$, said shaft being operated by a crank $S^{21}$. Projecting above the top of the revolving head $S^{12}$ and bolted thereto is a stop-block $S^{22}$, (shown in Figs. 3, 33, and 35,) said block being arranged as the head is revolved to strike a projecting flange $S^{24}$ on the collar $S^4$, as shown in Figs. 2 and 3. This collar-stop is arranged to limit the revolving motion of the crane-arm at any point desired. The vertical movement of the revolving head is regulated by the admission of pressure fluid controlled by the operating-lever $S^{10}$, and its upward movement is limited by the collar $S^4$. The horizontal movement of the traveling frame when running from the machine toward the standard is checked by the projection $S^{25}$ on the revolving head and the spring $S^{26}$ on the crane-arm $S^{16}$.

To obtain the flask preparatory to placing it on the machine, the operator swings the crane outward and runs out the traveling frame with the hand-crank till the hooks on the crane-arm are beneath the trunnions of the flask. By a movement of the operating-lever of the crane the pressure fluid is admitted to the twin cylinders through the valve until the crane-arms lift the flask to the desired height, the upward movement of the parts being checked by the stop-collar on the crane-standard. By the use of the hand-crank the operator then runs the traveling frame inward and swings the flask toward the machine until it is stopped by the stops on the crane-head and collar. The traveling frame is then run forward, the pressure in the cylinders released, and the flask lowered. With the descent of the frame the flask is deposited on the corrugated ring J of the machine, the descent of the frame continues till the hooks are below the flask-trunnions, a turn of the hand-crank withdraws the frame, and the crane is swung out for another flask.

We claim as our invention—

1. A machine for making sand molds embracing a sectional pattern, means for giving bodily advance movement to the entire pattern, and means for separately actuating one or more of the parts or sections of the pattern, acting to give advance movement to the same relatively to another of the sections during the bodily advance movement of the pattern.

2. A machine for making sand molds embracing a sectional pattern, means for advancing bodily the entire pattern, and means for separately actuating one or more of the pattern-sections, acting to give advance movement to the same relatively to another of the sections and to bring all of the sections into their proper relative positions at the termination of the bodily advance movement of the pattern and the giving of final pressure on the sand in the mold.

3. A machine for making sand molds embracing a sectional pattern, a movable cross-head on which all of the pattern-sections are supported and by which the pattern is bodily moved, means for giving advance movement to the cross-head, and actuating means for giving positive advance movement to one or more of the parts or sections of the pattern relatively to the cross-head, said actuating means embracing parts which are carried by and move with the cross-head and coacting parts on the machine-frame.

4. A machine for making sand molds embracing a sectional pattern, a cross-head upon which the parts of the pattern are supported, means for giving advance movement to the cross-head, and means for separately actuating one or more of the sections, embracing cams movably mounted on the cross-head, operative connections between said cams and the movable pattern section or sections, and means operated through the movement of the cross-head for actuating said cams, said cams acting to give advance movement to the sections operated thereby during the advance movement of the cross-head, and to hold the said sections fixedly in proper positions relative to each other and other parts of the pattern at the time of final pressure of the pattern on the sand.

5. A machine for making sand molds, embracing a cross-head on which the several sections of the pattern are supported, and means for separately moving one of the pattern-sections with respect to the cross-head comprising a rotative ring mounted on the cross-head and provided with cams, operative connections between the said cams and the pattern-section, a rock-shaft on the cross-head having operative engagement with said ring, and means acting through the movement of the cross-head acting to give oscillatory movement to said rock-shaft.

6. A machine for making sand molds comprising a sectional pattern, a cross-head upon which the parts of said pattern are supported, and means for separately moving one of said pattern-sections with respect to the cross-head comprising cams movably mounted on the cross-head and a rock-shaft mounted on the cross-head and having operative connection with said cams, said rock-shaft being provided with a rigidly-attached crank-arm, and a stop on the machine-frame adapted to act on the crank-arm of the rock-shaft in the movement of the cross-head.

7. A machine for making sand molds embracing a sectional pattern, a cross-head upon which the parts of the pattern are supported, and means for separately moving one of said pattern-sections relatively to the cross-head comprising a ring provided with cams, a rock-shaft mounted on the cross-head and having operative connection with the said ring, said rock-shaft having a rigidly-attached crank-arm, and a stop on the machine-frame adapted to act upon the crank-arm in the movement of the cross-head.

8. A machine for making sand molds embracing a sectional pattern, a cross-head on which the parts of the pattern are supported, and means for separately moving one of the pattern-sections relative to the cross-head comprising a rotative ring mounted on the cross-head and provided with cam-blocks and with gear-teeth, a rock-shaft mounted on the cross-head and provided with gear-segment which intermeshes with the gear-teeth on said ring and with a rigidly-attached crank-arm, and a stop on the machine-frame adapted to act on the crank-arm in the movement of the cross-head.

9. A machine for making sand molds embracing a sectional pattern, a movable cross-head on which the parts or sections of the pattern are supported, means for giving positive advance movement to the cross-head, actuating means for giving positive advance movement separately to the parts or sections relatively to the cross-head, comprising operative parts which are carried by and movable with the cross-head and which have operative connection with the pattern-sections, and stops on the machine-frame which coöperate with the operative parts on the cross-head in the advance movement of the latter, said stops being separately adjustable for determining the order in which the pattern-sections are advanced.

10. A machine for making sand molds embracing a sectional pattern and a common operating means for actuating the several parts or sections of the pattern acting to give positive advance movement to one of said parts or sections separately from another of said parts or sections, and to also give positive retractive movement to one of said parts or sections separately from another of said parts or sections.

11. A machine for making sand molds embracing a sectional pattern, a cross-head on which the parts of the pattern are supported, and means for separately moving a plurality of said pattern-sections relatively to the cross-head comprising parts movable with and on the cross-head and having operative connection with the pattern-sections, stops on the machine-frame which coact with said parts in the movement of the cross-head, said stops being separately adjustable to determine the order in which the several pattern-sections are advanced, and detents adapted to engage the said parts to effect the separate withdrawal of the pattern-sections, said detents being separately adjustable to determine the order of such withdrawal.

12. A machine for making sand molds, comprising a sectional pattern, a cross-head on which the parts of the pattern are supported, means for separately moving one of said pattern-sections relatively to the cross-head comprising a cam-ring mounted on the cross-head and having operative connection with the pattern-section, a rock-shaft having operative connection with said cam-ring and provided with a rigidly-attached crank-arm, a stop adapted to act on said arm in the advance movement of the cross-head, and a detent adapted to engage said arm in the retractive movement of the cross-head.

13. A machine for making sand molds comprising a sectional pattern, a cross-head on which the parts of the pattern are supported, means for separately moving one of said pattern-sections relatively to the cross-head comprising a cam-ring mounted on the cross-head and having operative connection with the pattern-section, a rock-shaft having operative connection with said cam-ring and provided with a rigidly-attached crank-arm, a stop adapted to act on said arm in the advance movement of the cross-head, and a detent adapted to engage said arm in the retractive movement of the cross-head, said stop and detent being separately adjustable on the machine-frame to enable the time of the advance and retractive movements of the pattern-section to be varied.

14. A machine for making sand molds comprising a sectional pattern, a cross-head, a plurality of cam-rings arranged concentrically on the cross-head, and severally having operative connections with the pattern-sections, a plurality of rock-shafts mounted on the cross-head and provided with gear-segments which severally engage the cam-rings, the outer rock-shafts being tubular and surrounding the inner one, and said rock-shafts having each a rigidly-attached crank-arm, and a plurality of stops on the machine-frame adapted to act on said crank-arms in the movement of the cross-head.

15. A machine for making sand molds comprising a sectional pattern, a cross-head, a plurality of rotative cam-rings arranged concentrically on the cross-head, separate actuating means for said rings operated through the movement of the cross-head, a plurality of spider-frames having separate sliding connection with the cross-head and provided with depending arms which engage the cam-surfaces of the cam-rings, said spider-frames being adapted to severally support the pattern-sections.

16. A machine for making sand molds comprising a sectional pattern, a cross-head, a plurality of rotative cam-rings arranged concentrically on the cross-head, separate actuating means for the said cam-rings, a plurality of spider-frames having vertically-sliding connection with the cross-head and provided with depending arms which engage the cams on the cam-rings and adjustable means for separately limiting the descent of said spider-frames.

17. A machine for making sand molds comprising a sectional pattern, a cross-head, a flask-supporting ring rigidly supported on the cross-head, a plurality of spider-frames arranged to slide vertically on the cross-head, a plurality of cam-rings mounted on the cross-head and having operative connection with the spider-frames, and means operated through the movement of the cross-head acting to give rotative movement to said cam-rings.

18. A molding-machine comprising a sectional pattern, a vertically-movable cross-head, a spider-frame mounted on the cross-head and supporting one of the pattern-sections, a cam-ring provided with cam-blocks which act on said spider-frame, and means for giving rotative movement to said ring, said cam-blocks having flat top surfaces by which the spider-frame is positively held in its elevated position.

19. A molding-machine comprising a sectional pattern, a vertically-movable cross-head, rock-shafts mounted on the cross-head and having operative connection with the pattern-section, said rock-shafts having rigidly-attached crank-arms, upright guide-rods on the machine-frame, sliding blocks on said rods having pivotal and sliding connection with said crank-arms, adjustable stops on the said guide-rods for limiting the upward movement of said sliding blocks, other upright rods on the frame and blocks adjustably secured on said last-mentioned rods and provided with yielding detents adapted to engage the said sliding blocks in the descent of the same.

20. A machine for making sand molds comprising a machine-frame, a vertically-movable cross-head, a pattern supported thereon, and a pressure-plate located over the pattern and having a free vertical movement on the frame.

21. A machine for making sand molds comprising a machine-frame provided with a rigidly-attached top plate, a vertically-movable cross-head, a pattern supported on the cross-head, a pressure-ring rigidly attached to the top plate below the same, and a pressure-plate located below and having free vertical movement toward and from the pressure-ring.

22. A machine for making sand molds comprising a machine-frame provided with a rigidly-attached top plate, a vertically-movable cross-head, a pattern supported by the cross-head, a horizontal pressure-ring rigidly attached to the top plate below the same, a pressure-plate located below the pressure-ring and having free vertical movement on the frame, and vent-pins rigidly secured in the pressure-ring and passing through holes in the pressure-plate.

23. A machine for making sand molds comprising a machine-frame provided with a rigidly-attached top plate, a vertically-movable cross-head, a pattern supported on the cross-head, a pressure-ring rigidly attached to the top plate below the same and provided with a central opening, a vertically-movable pressure-plate located below the pressure-ring and provided with a cylindric flange which rises through the central opening of the pressure-ring, and a ring attached to the upper margin of the said flange and adapted to enter the runner-box of the flask to compress the sand therein.

24. A machine for making sand molds comprising a machine-frame provided with a rigidly-attached top plate, a vertically-movable cross-head, a pattern supported on the cross-head, a vertically-movable sprue-pattern plunger provided with a tubular plunger-stem, a cylinder into which the plunger-stem extends, a piston on the said stem which slides in said cylinder, sprue-patterns adapted to slide endwise in the plunger, a vertically-movable rod to which said sprue-patterns are attached and which rises through the said stem and the piston thereon, and a detent adapted for engagement with the upper end of said rod, and acting to support the rod and plunger in their elevated positions.

25. The combination with a top plate, of a vertically-movable sprue-pattern plunger provided with a hollow stem, a cylinder into which said stem projects, a piston attached to the stem and sliding in the cylinder, sprue-patterns which slide in the plunger, an operating-rod to which said sprue-patterns are attached and which extends upwardly through said stem and piston to a point above the latter, a detent-lever pivoted on the cylinder and having a detent-arm within the same which is adapted for engagement with said rod, said detent-lever having an arm which extends outside of the cylinder, and means connected with the said arm of the detent-lever for operating the same.

26. The combination of a top plate, of a vertically-movable sprue-pattern plunger provided with a stem which rises through the top plate, sprue-patterns which slide vertically in said plunger, a vertically-sliding rod with which said sprue-patterns are connected and which rises through the said stem, means engaging the said rod for holding the sprue-patterns and plunger elevated and a shoulder on said stem adapted for engagement with a stationary part on the top plate to limit the upward movement of the plunger.

27. The combination with a top plate, of a cylinder attached to the same and provided with vertical guide-grooves in its side walls, a sprue-pattern plunger provided with a stem which rises into the said cylinder, a cross-head on the upper end of the said stem provided with arms which engage said guide-grooves, and a piston attached to the stem and fitting the interior of the cylinder, said arms on the cross-head being extended in said grooves along the surface of the piston to close said grooves in their parts opposite the piston.

28. A machine for making sand molds comprising a vertically-movable cross-head, a pattern supported thereon, sand-delivery mechanism embracing a stationary receptacle provided with two compartments separated by a valve, with a spout which is movable horizontally relatively to the receptacle in a direction to carry its delivery end toward and from the pattern and with a discharge-valve, means actuated by the cross-head in its vertical movement for operating the compartment-separating valve, and a hand-lever connected with and operating the discharge valve and spout.

29. A machine for making sand-molds comprising a vertically-movable cross-head, a pattern supported thereon, a vertically-movable sprue-pattern plunger, a vertically-movable sand-ring, detents for holding said sprue-pattern plunger and sand-ring elevated, tripping means for releasing the same, a sand-delivery mechanism embracing a sand-receptacle provided with a discharge-valve and with a discharge-spout which is movable toward and from the pattern, a hand-lever which is connected with and operates the discharge-valve and discharge-spout, and a latch-lever on said hand-lever which is connected with and operates said tripping means.

30. A machine for making sand molds comprising a vertically-movable cross-head, a pattern supported thereon, a vertically-movable sprue-pattern plunger, a vertically-movable sand-ring, detents for holding said sprue-pattern plunger and sand-ring elevated, tripping means for releasing the same, a sand-delivery mechanism embracing a receptacle provided with a discharge-valve and with a discharge-spout which is movable toward and from the pattern, a hand-lever which is connected with and operates the discharge-valve and discharge-spout, a latch-lever on the hand-lever and means operating the tripping mechanism embracing a pin which slides on the hand-lever and which is connected with and moved by the latch-lever and a lever connected with the tripping mechanism and provided with a curved arm which is engaged and moved by said pin when the latch-lever is operated and remains in engagement with said pin during the movement of the said hand-lever.

ANDREW L. ANDERSON.
OSCAR ANDERSON.

Witnesses:
JULIUS RUBINSTEIN,
CHARLES F. GLAESER.